United States Patent
McKenna et al.

(10) Patent No.: US 7,551,927 B2
(45) Date of Patent: *Jun. 23, 2009

(54) COMMUNIQUE WIRELESS SUBSCRIBER DEVICE FOR A CELLULAR COMMUNICATION NETWORK

(75) Inventors: Daniel B. McKenna, Steamboat Springs, CO (US); James M. Graziano, Platteville, CO (US)

(73) Assignee: QUALCOMM, Incorporated, San Diego, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 11/208,262

(22) Filed: Aug. 18, 2005

(65) Prior Publication Data

US 2005/0277424 A1 Dec. 15, 2005

Related U.S. Application Data

(63) Continuation of application No. 09/774,955, filed on Jan. 31, 2001, now Pat. No. 6,954,641, which is a continuation-in-part of application No. 09/638,744, filed on Aug. 14, 2000, now Pat. No. 6,594,498.

(51) Int. Cl.
  *H04Q 7/20* (2006.01)
  *H04Q 7/00* (2006.01)
  *H04M 3/16* (2006.01)
  *H04M 1/66* (2006.01)

(52) U.S. Cl. .................. 455/450; 455/422.1; 455/519; 455/432.3; 455/435.1; 455/411; 455/509

(58) Field of Classification Search ... 455/435.1–435.3, 455/445, 466, 456.1–456.3, 456.5–456.6, 455/457, 463–464, 59, 503, 550.1, 560–561, 455/556.2, 414.1–414.4, 3.02–3.04, 405–408, 455/403, 500, 410–411, 412.1, 412.2, 418–420, 455/422.1, 432.1–432.3, 433–434, 507–526, 455/88, 415–416, 424–425, 455, 2.01, 61–62, 455/428, 224, 266, 448–451, 454, 502, 551, 455/553.1; 340/825.22, 7.45–7.46; 370/328–329, 370/338, 341, 350, 260–261, 270, 310, 310.1, 370/313, 315, 420, 913; 348/14.01–14.02, 348/14.08, 729, 487, 492; 381/2–6, 14; 713/162–172; 375/E7.012
See application file for complete search history.

(56) References Cited

U.S. PATENT DOCUMENTS

| | | | |
|---|---|---|---|
| 5,499,386 A | 3/1996 | Karlsson | |
| 5,553,315 A | 9/1996 | Sobti et al. | |
| 5,613,191 A | 3/1997 | Hylton et al. | |
| 5,844,522 A | 12/1998 | Sheffer et al. | |
| 5,852,775 A | 12/1998 | Hidary | |
| 5,862,345 A | 1/1999 | Okanoue et al. | |
| 5,882,345 A | 3/1999 | Yoon | |
| 5,911,120 A | 6/1999 | Jarett et al. | |
| 5,983,005 A | 11/1999 | Butterworth et al. | |
| 6,026,289 A | 2/2000 | Zellner et al. | |
| 6,038,452 A | 3/2000 | Strawczynski et al. | |
| 6,047,189 A | 4/2000 | Yun et al. | |
| 6,070,070 A * | 5/2000 | Ladue | 455/419 |
| 6,081,536 A * | 6/2000 | Gorsuch et al. | 370/468 |
| 6,097,949 A * | 8/2000 | Jung et al. | 455/466 |
| 6,104,922 A * | 8/2000 | Baumann | 455/410 |
| 6,148,198 A * | 11/2000 | Anderson et al. | 455/432.1 |
| 6,161,016 A * | 12/2000 | Yarwood | 455/445 |
| 6,169,894 B1 | 1/2001 | McCormick et al. | |
| 6,175,743 B1 * | 1/2001 | Alperovich et al. | 455/466 |
| 6,219,346 B1 | 4/2001 | Maxemchuk | |
| 6,256,509 B1 | 7/2001 | Tanaka et al. | |
| 6,314,094 B1 | 11/2001 | Boys | |

| | | | |
|---|---|---|---|
| 6,337,715 B1 | 1/2002 | Inagaki et al. | |
| 6,338,140 B1* | 1/2002 | Owens et al. | 713/168 |
| 6,351,647 B1 | 2/2002 | Gustafsson | |
| 6,360,076 B1 | 3/2002 | Segura et al. | |
| 6,385,455 B1* | 5/2002 | St. Clair et al. | 455/450 |
| 6,389,288 B1 | 5/2002 | Kuwahara et al. | |
| 6,397,076 B1* | 5/2002 | Brown et al. | 455/521 |
| 6,400,942 B1* | 6/2002 | Hansson et al. | 455/426 |
| 6,408,179 B1 | 6/2002 | Stosz et al. | |
| 6,430,185 B1 | 8/2002 | Kerns et al. | |
| 6,442,258 B1 | 8/2002 | Mashinsky | |
| 6,490,432 B1 | 12/2002 | Wegener et al. | |
| 6,493,331 B1 | 12/2002 | Walton et al. | |
| 6,510,327 B1 | 1/2003 | Jung et al. | |
| 6,594,498 B1* | 7/2003 | McKenna et al. | 455/517 |
| 6,600,917 B1 | 7/2003 | Maupin | |
| 6,605,120 B1 | 8/2003 | Fields et al. | |
| 6,611,684 B1* | 8/2003 | Franks | 455/433 |
| 6,612,932 B2 | 9/2003 | Stern | |
| 6,622,016 B1 | 9/2003 | Sladek et al. | |
| 6,625,442 B1 | 9/2003 | Kojima | |
| 6,631,122 B1 | 10/2003 | Arunachalam et al. | |
| 6,647,257 B2 | 11/2003 | Owensby | |
| 6,650,902 B1 | 11/2003 | Richton | |
| 6,825,442 B2 | 11/2004 | Schroth | |
| 6,898,423 B2 | 5/2005 | Motegi et al. | |
| 6,934,527 B1 | 8/2005 | Hamada | |
| 6,954,641 B2* | 10/2005 | McKenna et al. | 455/435.1 |
| 6,968,179 B1 | 11/2005 | De Vries | |
| 6,970,020 B1 | 11/2005 | Periyalwar et al. | |
| 6,977,912 B1 | 12/2005 | Porter et al. | |
| 7,003,115 B1 | 2/2006 | Suzuki et al. | |
| 7,024,464 B1 | 4/2006 | Lusher et al. | |
| 7,049,971 B2 | 5/2006 | Guillory | |
| 2001/0055379 A1 | 12/2001 | Mamiya et al. | |
| 2001/0056354 A1 | 12/2001 | Feit et al. | |
| 2002/0027894 A1 | 3/2002 | Arrakoski et al. | |
| 2002/0059218 A1* | 5/2002 | August et al. | 707/5 |
| 2002/0087401 A1* | 7/2002 | Leapman et al. | 705/14 |

FOREIGN PATENT DOCUMENTS

| | | |
|---|---|---|
| DE | 4338023 | 5/1995 |
| DE | 29918265 | 2/2000 |
| DE | 29918265 | 3/2000 |
| EP | 0837609 | 4/1998 |
| EP | 0998075 | 5/2000 |
| EP | 1037434 | 9/2000 |
| EP | 1058465 | 12/2000 |
| EP | 1081606 | 3/2001 |
| FR | 2816143 | 5/2002 |
| GB | 2327571 | 1/1999 |
| JP | 08-111891 | 4/1996 |
| JP | 10-30449 | 11/1998 |
| JP | 10-304449 | 11/1998 |
| JP | 11-136720 | 5/1999 |
| JP | 11-243569 | 9/1999 |
| JP | 11-262054 | 9/1999 |
| JP | 2000-004475 | 1/2000 |
| JP | 2000-013864 | 1/2000 |
| JP | 2000-101566 | 4/2000 |
| JP | 2000-138966 | 5/2000 |
| JP | 2000-175250 | 6/2000 |
| JP | 2000-201145 | 7/2000 |
| JP | 2001-510970 | 8/2001 |
| JP | 2002-511670 | 4/2002 |
| JP | 2002-520707 | 7/2002 |
| WO | 199428687 | 12/1994 |
| WO | 199615639 | 5/1996 |
| WO | 199631992 | 10/1996 |
| WO | 199810604 | 3/1998 |
| WO | 199832265 | 7/1998 |
| WO | 99004583 | 1/1999 |
| WO | 199907168 | 2/1999 |
| WO | 99052304 | 10/1999 |
| WO | 199959355 | 11/1999 |
| WO | 199966670 | 12/1999 |
| WO | 200002389 | 1/2000 |
| WO | 200027080 | 5/2000 |
| WO | 200041359 | 7/2000 |
| WO | 200069163 | 11/2000 |
| WO | 200070898 | 11/2000 |
| WO | 200079734 | 12/2000 |

OTHER PUBLICATIONS

"Multicast for Mobility Protocol (MMP) for Emerging Internet Networks", by A. Mihailovic, Published Sep. 2000, pp. 327-333, In The Eleventh IEEE International Symposium on Personal, Indoor and Mobile Radio Communications (PIMRC 2000) London UK.

Dong-Hood, Nam et al., "Adaptive Multimedia Stream Presentation in Mobile Computing Environment", Tencon 99, Proceedings of the IEEE Region 10 Conference, Cheju Island, South Korea, Sep. 15-17, 1999, pp. 966-969, IEEE, Piscataway, NJ.

Gubbi, R., "Multimedia Streams and Quality of Service in the Next Generation Wireless Home Networks," Mobile Multimedia Communication, 1999, 1999 IEEE International Workshop on San Diego, CA, Nov. 15-17, 1999, Piscataway, NJ, USA, IEEE, pp. 232-235.

TSGW1 #3 (99) 200 TSG-RAN Working Group 1 Radio Meeting #3, Eskilstuna, Sweden 22026, Mar. 1999.

International Search Report PCT/US2001/025331, International Search Authority-European Patent Office, Jun. 25, 2002.

International Search Report PCT/US2001/025329, International Search Authority-European Patent Office, Mar. 7, 2002.

International Search Report PCT/US2001/025328, International Search Authority-European Patent Office, Jun. 25, 2002.

International Search Report PCT/US2001/025323, International Search Authority-European Patent Office, Jun. 21, 2002.

International Search Report PCT/US2001/049674, International Search Authority-European Patent Office, Oct. 22, 2002.

International Search Report PCT/US2001/025375, International Search Authority-European Patent Office, Jul. 10, 2002.

International Search Report PCT/US2001/049685, International Search Authority-European Patent Office, Oct. 2, 2002.

International Search Report PCT/US2001/049700, International Search Authority-European Patent Office, Jun. 18, 2003.

International Search Report PCT/US2001/025325, International Search Authority-European Patent Office, Jun. 21, 2002.

International Preliminary Examination Report - PCT/US01/025331, IPEA - European Patent Office, Dec. 10, 2002.

International Preliminary Examination Report - PCT/US01/025329, IPEA - European Patent Office, Nov. 29, 2002.

International Preliminary Examination Report - PCT/US01/025328, IPEA - European Patent Office, Nov. 29, 2002.

International Preliminary Examination Report - PCT/US01/025323, IPEA - European Patent Office, Dec. 5, 2002.

International Preliminary Examination Report - PCT/US01/049674, IPEA - US, Dec. 12, 2003.

International Preliminary Examination Report - PCT/US01/025375, IPEA - European Patent Office, Oct. 25, 2002.

International Preliminary Examination Report - PCT/US01/049685, IPEA - US, Nov. 3, 2003.

International Preliminary Examination Report - PCT/US01/049700, IPEA - US, Nov. 16, 2004.

International Preliminary Examination Report - PCT/US01/025325, IPEA - European Patent Office, Nov. 22, 2002.

* cited by examiner

*Primary Examiner*—Meless N Zewdu
(74) *Attorney, Agent, or Firm*—Mary Fales

(57) ABSTRACT

The wireless subscriber device that is operable in a communique system for cellular communication networks operates with existing cellular communication networks to provide communique communication services to subscribers. The Communique can be unidirectional (broadcast) or bidirectional (interactive) in nature and the extent of the Communique can be network-wide broadcast or narrowcast, where cells and/or cell sectors are grouped to cover a predetermined geographic area or demographic population or subscriber interest group to transmit information to subscribers who populate the target audience for the narrowcast transmissions. The wireless subscriber devices used to communicate with the communique system for cellular communication networks are typically full function communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device. The wireless subscriber devices can either be mobile wireless communication devices in the traditional mobile subscriber paradigm, or the fixed wireless communication devices in the more recent wireless product offerings. Furthermore, these communique communication services can be free services, subscription based services, or toll based services, while the data propagation can be based on push, pull and combinations of push/pull information distribution modes.

36 Claims, 11 Drawing Sheets

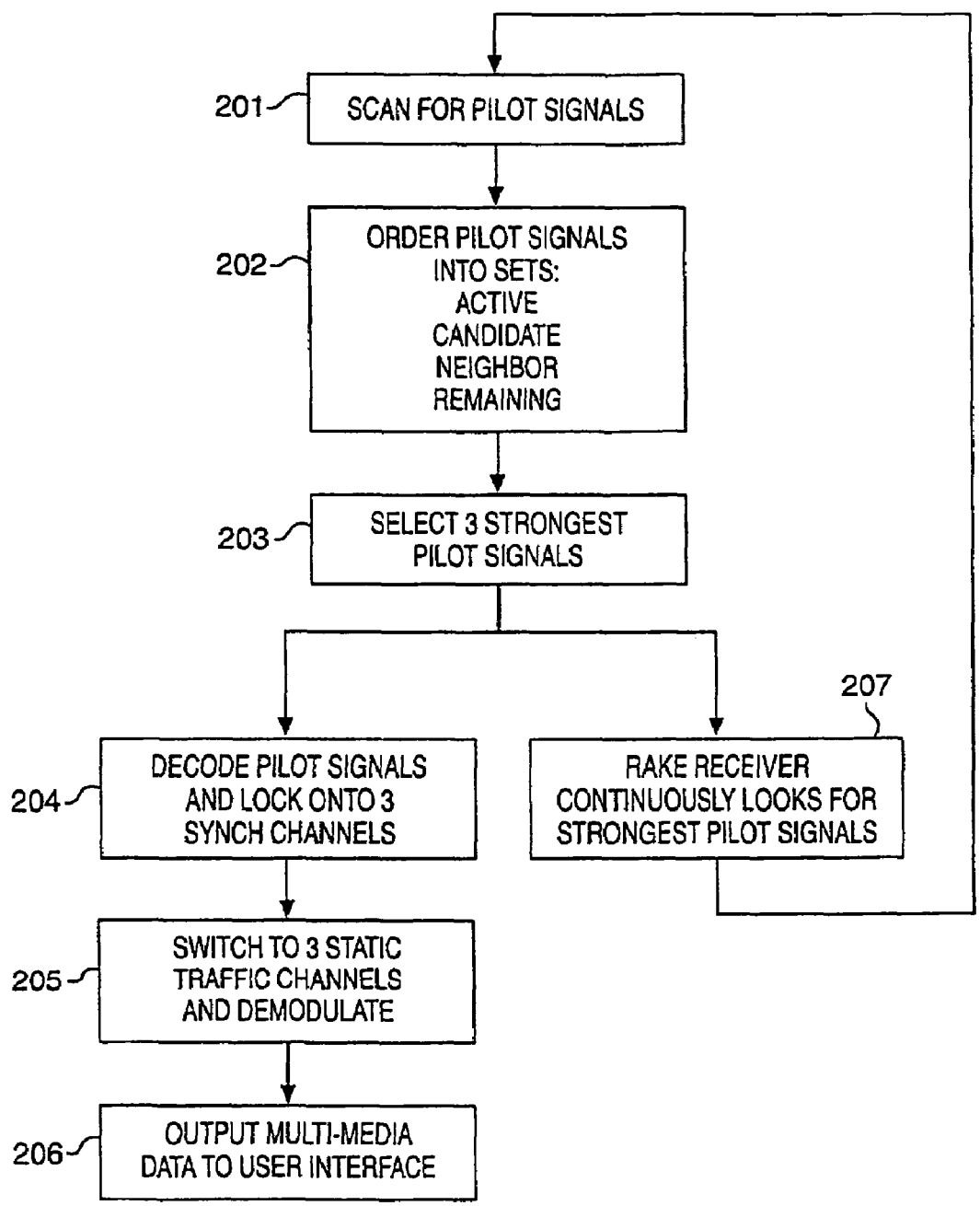

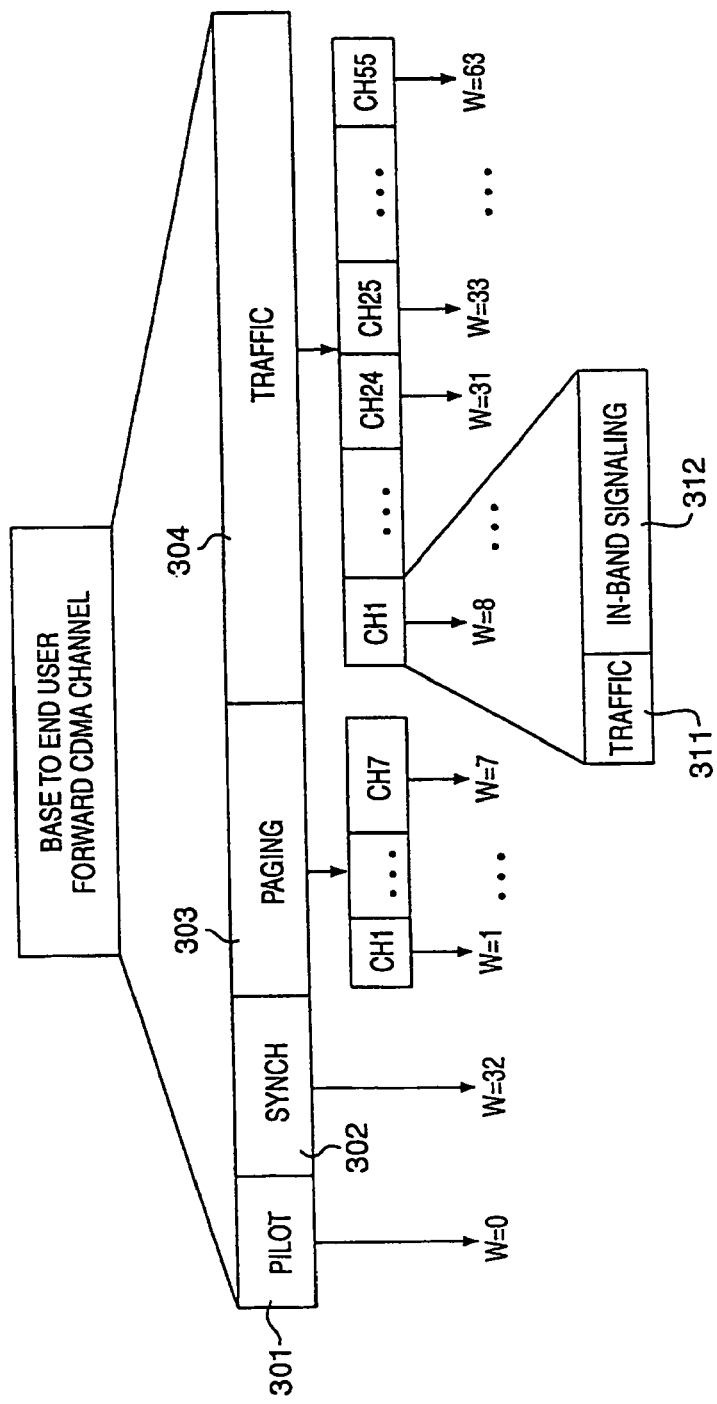
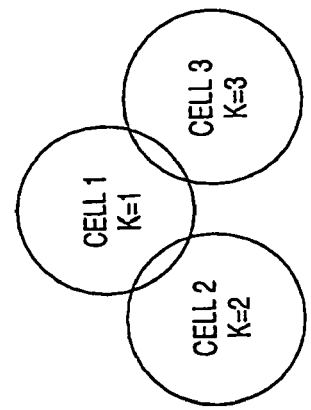
FIG. 3
FIG. 4

US 7,551,927 B2

COMMUNIQUE WIRELESS SUBSCRIBER DEVICE FOR A CELLULAR COMMUNICATION NETWORK

CROSS REFERENCE TO RELATED APPLICATIONS

This application is a continuation of U.S. patent application Ser. No. 09/774,955 filed on Jan. 31, 2001 now U.S. Pat. No. 6,954,641, which is a continuation-in-part of U.S. patent application Ser. No. 09/638,744, title "Communique System for Cellular Communication Networks" and filed on 14 Aug. 2000 and issued 15 Jul. 2003 as U.S. Pat. No. 6,594,498.

FIELD OF THE INVENTION

This invention relates to cellular communication networks and to a communique wireless subscriber device that is operable in a communique system that makes use of the bandwidth capacity in existing point-to-point cellular communication networks to provide subscribers with access to a plurality of broadcast and narrowcast based services.

BACKGROUND OF INVENTION

It is a problem in cellular communication networks that the network topology is exclusively point to point in nature. This paradigm represents the historical view of cellular communications as a wireless equivalent of traditional wire-line telephone communication networks, which serve to interconnect a calling party with a called party. An additional problem in cellular communication networks is that the need to concurrently serve many voice subscribers with the limited bandwidth available in cellular communication networks has prevented the provision of wide bandwidth communication services, such as data, to these subscribers.

The third generation (3G) wireless communication systems, as specified by the ITU/IMT-2000 requirements for cellular communications, represent a step toward solving the above-noted problems. The third generation wireless communication systems support the provision of advanced packet data services. In 3G/IMT-2000 systems, dynamic Internet Protocol address assignment is required in addition to static Internet Protocol (IP) address assignment. With static IP address assignment, the wireless communique wireless subscriber device's static IP address is fixed and assigned by the home wireless network. When the wireless communique wireless subscriber device is away from its home wireless network (roaming), a special data communications link (Wireless IP tunnel) needs to be established between the visited wireless network and the home wireless network. In this case, IP packets destined to the wireless communique wireless subscriber device's IP address of the home wireless network are routed to the home wireless network according to standard IP routing. A Wireless IP tunnel is used in the home wireless network to redirect the IP packets that are destined to the wireless communique wireless subscriber device's static IP address to the visited wireless network where the roaming wireless communique wireless subscriber device is located and being served. When a wireless communique wireless subscriber device moves from one wireless network coverage area to another, Wireless IP mobility binding updates are performed between the wireless communique wireless subscriber device and its Home Agent (HA) in the home wireless network. Since both the wireless station's IP address and its Home Agent IP address are static or fixed, a shared secret between the wireless communique wireless subscriber device and the Home Agent can be preprogrammed into the wireless station and its Home Agent so that the Home Agent can authenticate Wireless IP registrations requested by the wireless communique wireless subscriber device and perform mobility binding updates in a secure manner.

However, even with advances in bandwidth utilization and the provision of packet data services, the cellular communication networks still operate on a point to point paradigm, with the networks being unable to concurrently communicate data to a plurality of subscribers, which is the fundamental concept of broadcast communications, especially in the case of a dynamically changing audience for the broadcasts.

Solution

The above described problems are solved and a technical advance achieved by the communique wireless subscriber device that operates with existing cellular communication networks to provide communique communication services to subscribers. The Communique can be unidirectional (broadcast) or bidirectional (interactive) in nature and the extent of the Communique can be network-wide broadcast or narrowcast, where cells and/or cell sectors are grouped to cover a predetermined geographic area or demographic population or subscriber interest group to transmit information to subscribers who populate the target audience for the narrowcast transmissions. The grouping of cells to form the communique coverage area for the narrowcast transmissions can be hierarchical in nature and composed of combinations of in-building wireless coverage areas, standard terrestrial cells, non-terrestrial cells, orchestrated in a hierarchical manner.

The content of these communique transmissions can be multi-media in nature and comprise a combination of various forms of media: audio, video, graphics, text, data and the like. The communique wireless subscriber devices used to communicate with the communique system for cellular communication networks are typically full finction communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device. The communique wireless subscriber devices can either be mobile wireless communication devices in the traditional mobile subscriber paradigm, or the fixed wireless communication devices in the more recent wireless product offerings. Furthermore, these communique communication services can be free services, subscription based services, or toll based services, while the data propagation can be based on push, pull and combinations of push/pull information distribution modes.

BRIEF DESCRIPTION OF THE DRAWING

FIG. 2 illustrates in flow diagram form the operation of a typical cellular communication system in implementing an idle handoff mode of operation;

FIG. 3 illustrates in block diagram form a typical configuration of the base to end user forward CDMA channel used in cellular communication networks;

FIG. 4 illustrates in block diagram form a typical assignment of cells in a cellular communication network for a unidirectional transmission without subscriber registration mode of operation of the present communique system for cellular communication networks;

DETAILED DESCRIPTION

Existing cellular communication networks are designed with a network topology that is exclusively point to point in nature. This paradigm represents the historical view of cellular communications as a wireless equivalent of traditional wire-line telephone communication networks, which serve to interconnect a calling party with a called party. The need to concurrently serve many voice subscribers with the limited bandwidth available in cellular communication networks has also prevented the provision of wide bandwidth communication services to these subscribers.

These existing systems are largely static in their operation, with each cell providing point to point communications to a population of subscribers who reside in or roam into the predefined service area of the cell. There is an absence of a capability to provide a communication service to a subscriber population that comprises a dynamically changing coverage area that spans multiple cells. The dynamic convergence of a plurality of subscribers to constitute a target audience for Communiques is a paradigm that is not addressed by existing cellular communication systems, nor is there any functionality suggested in existing cellular communication systems to deal with providing information relevant to this target audience in a real time manner.

Cellular Communication Network Philosophy

Figure 1A:
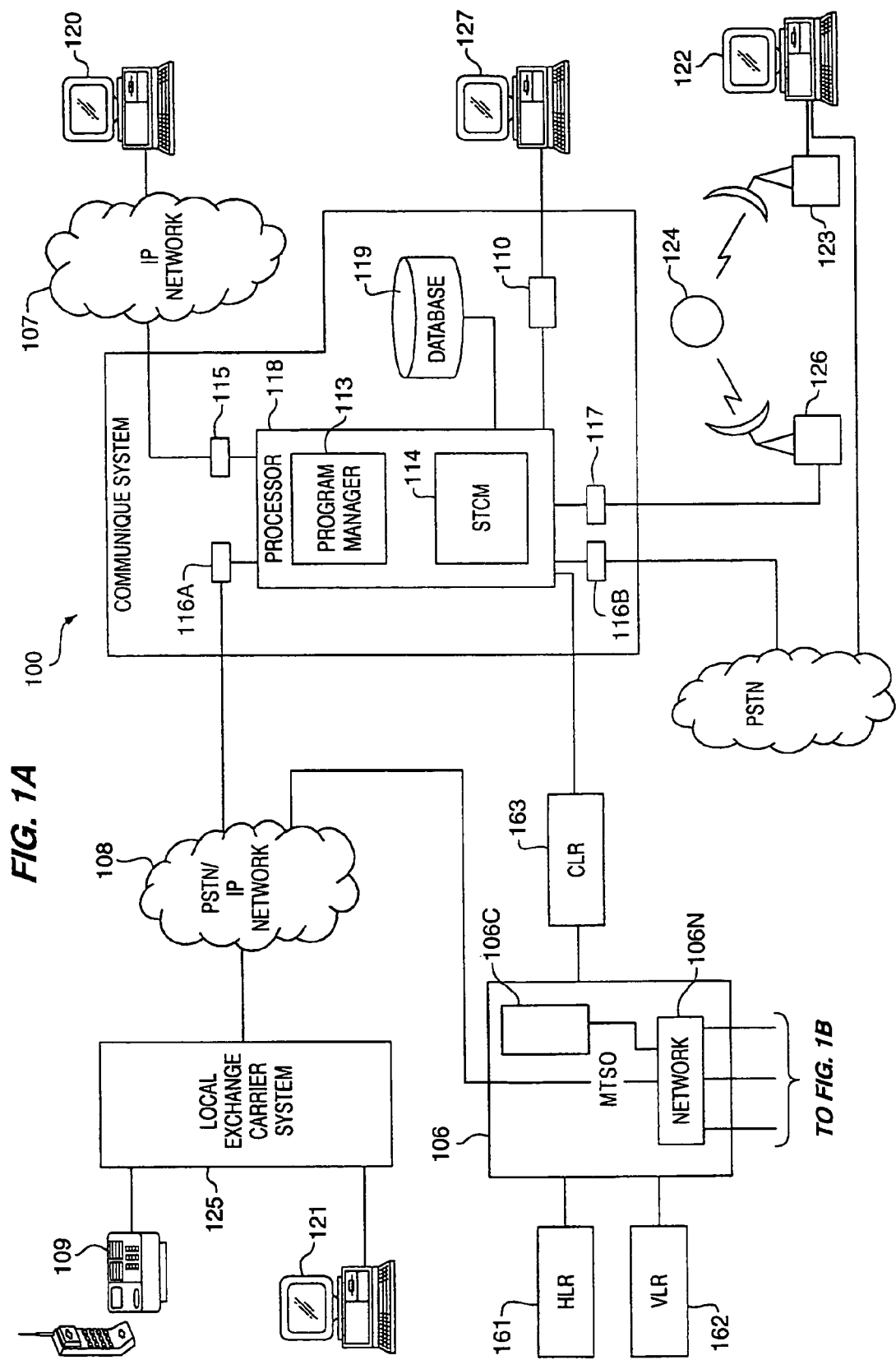
FIGS. 1A&1B illustrate in block diagram form the overall architecture of a typical cellular communication network that is equipped with the present communique system for cellular communication networks and in which environment the present communique wireless subscriber device is operable.
Figure 1B:
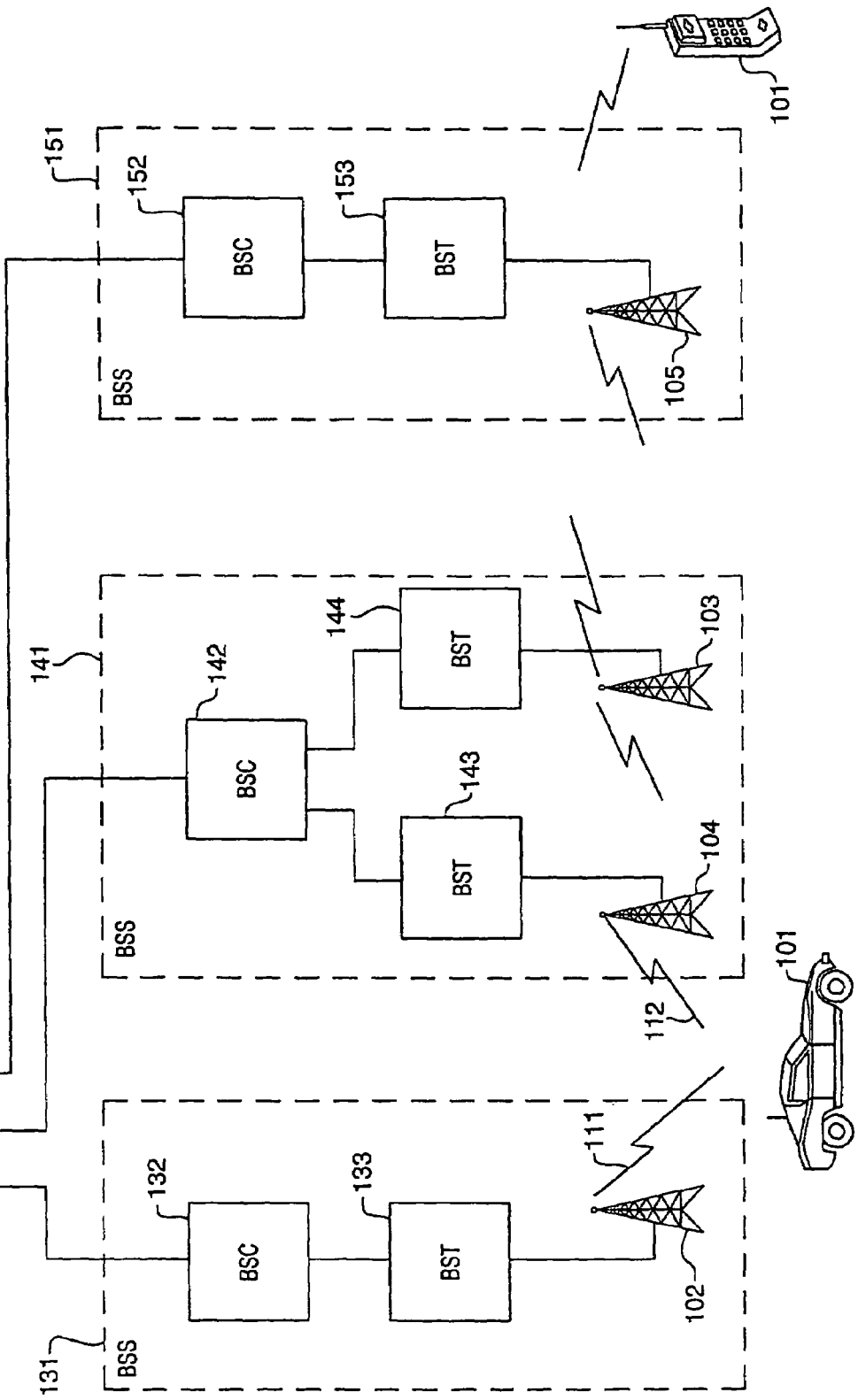

Cellular communication networks, as shown in block diagram form in FIGS. 1A & 1B, provide the service of connecting wireless telecommunication customers, each having a wireless subscriber device, to both land-based customers who are served by the common Carrier Public Switched Telephone Network (PSTN) 108 as well as other wireless telecommunication customers. In such a network, all incoming and outgoing calls are routed through Mobile Telephone Switching Offices (MTSO) 106, each of which is connected to a plurality of cell sites (also termed Base Station Subsystems 131-151) which communicate with wireless subscriber devices 101, 101' located in the area covered by the cell sites. The wireless subscriber devices 101, 101' are served by the cell sites, each of which is located in one cell area of a larger service region. Each cell site in the service region is connected by a group of communication links to the Mobile Telephone Switching Office 106. Each cell site contains a group of radio transmitters and receivers (Base Station Transceiver 132, 142, 143, 152) with each transmitter-receiver pair being connected to one communication link. Each transmitter-receiver pair operates on a pair of radio frequencies to create a communication channel: one frequency to transmit radio signals to the wireless subscriber device and the other frequency to receive radio signals from the wireless subscriber device.

The first stage of a cellular communication connection is set up when a transmitter-receiver pair in a cell site 131, operating on a predetermined pair of radio frequencies, is turned on and a communiqué wireless subscriber device MS, located in the cell site 131, is tuned to the same pair of radio frequencies to thereby activate a communication channel between the communiqué wireless subscriber device MS and the cell site 131. The second stage of the communication connection is between the communication link connected to this transmitter-receiver pair and the common carrier Public Switched Telephone Network 108. This second stage of the communication connection is set up in the Mobile Telephone Switching Office 106, which is connected to the common carrier Public Switched Telephone Network 108 by incoming and outgoing trunks.

The Mobile Telephone Switching Office 106 contains a switching network 106N to switch wireless subscriber voice and/or data signals from the communication link to an incoming or outgoing trunk. The Mobile Telephone Switching Office 106 and associated software typically manages the base station controllers 132, 142, 152 and the Base Station Transceiver Transmit/Receive electronics which serve to implement the wireless radio frequency link to the wireless subscriber devices 101. The Mobile Telephone Switching Office 106, in conjunction with the Home Location Register (HLR) 161 and the Visitor Location Register (VLR) 162, manages subscriber registration, subscriber authentication, and the provision of wireless services such as voice mail, call forwarding, roaming validation and so on. The Mobile Telephone Switching Office Controller 106C also controls the actions of the associated base station controllers 132, 142, 152 by generating and interpreting the control messages that are exchanged with the associated base station controllers 132, 142, 152 over data links that interconnect these subsystems. The base station controllers 132, 142, 152 at each cell site 131-151, in response to control messages from the Mobile Telephone Switching Office 106, control the transmitter-receiver pairs at the cell site 131. The control processes at each cell site also control the tuning of the wireless subscriber devices to the selected radio frequencies. In the case of CDMA, the system also selects the PN code word to enhance isolation of the communications with the wireless subscriber devices.

Each cell in the cellular communication network comprises a predetermined volume of space radially arranged around the cell site-transmitting antenna with the region of space roughly approximating a cylindrical volume having predetermined height. Since all of the wireless subscriber devices are installed in ground-based units (such as motor vehicles or handheld units) in traditional cellular communication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based wireless subscriber device initiates a call connection, control signals from the local cell site transmitter cause the frequency agile transponder in the ground-based wireless subscriber device to operate at the frequency of operation designated for that particular cell site. As the ground-based wireless subscriber device moves from one cell site to another, the call connection is handed off to the successive cell sites and the frequency agile transponder in the ground-based wireless subscriber device adjusts its frequency of operation to correspond to the frequency of operation of the transmitter located in the cell site in which the ground-based wireless subscriber device is presently operational.

There are numerous technologies that can be used to implement the cellular communication network and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access (CDMA) that uses orthogonal codes to implement communication channels, Time Division Multiple Access (TDMA) which uses time division multiplexing of a frequency to implement communication channels and Frequency Division Multiple Access (FDMA) which uses separate frequencies to implement communication channels, as well as combinations of these technologies. These concepts are well known in the field of cellular communications and various ones of these can be used to implement the ubiquitous wireless subscriber device of the present invention. These technologies are not limitations to the system that is described herein, since a novel system concept is disclosed, not a specific technologically limited implementation of an existing system concept.

The traditional CDMA cellular network architecture is designed to carry a wireless call between a wireless subscriber device and a base station, by simultaneously using multiple base stations or antennas to mitigate the effects of signal fading of various types, including, but not limited to: Raleigh, rician and log-normal. If one cell or one antenna in the CDMA cellular network has a poor signal for a given time frame, another cell or antenna in the CDMA cellular network which had an acceptable signal carries the call. This call management process is called soft or softer hand-off, depending on whether the call is carried between two cells or two antennas at a given cell, respectively.

Cellular Communication Network Architecture

FIG. 1 is the block diagram of the architecture of the present communique system for cellular communication networks 100 and one example of an existing commercial cellular communication network in which it is implemented. In the description of the present communique system for cellular communication networks, the major entities of the cellular communication network providing communique services to the communiqué wireless subscriber device MS are the Base Station Subsystems 131-151 that are associated with the Mobile Telephone Switching Office 106. In a typical cellular communications network, there are numerous Mobile Telephone Switching Offices 106, but for the sake of simplicity only a single Mobile Telephone Switching Office is shown.

The typical implementation of an existing Mobile Telephone Switching Office 106 comprises a Mobile Telephone Switching Office Controller 106C which executes call processing associated with the Mobile Telephone Switching Office 106. A switching network 106N provides the telephone connectivity between Base Station Subsystems 131-151. Base Station Subsystems 131-151 communicate with communiqué wireless subscriber device MS using Radio Frequency (RF) channels 111 and 112, respectively. RF channels 111 and 112 convey both command messages as well as digital data, which may represent voice signals being articulated at the communiqué wireless subscriber device MS and the far-end party. With a CDMA system, the communiqué wireless subscriber device MS communicates with at least One Base Station Subsystem 131. In FIG. 1, the communiqué wireless subscriber device MS is simultaneously communicating with two Base Station Subsystems 131, 141, thus constituting a soft handoff. However, a soft handoff is not limited to a maximum of two base stations. Standard EIA/TIA IS-95-B supports a soft handoff with as many as six base stations. When in a soft handoff, the base stations serving a given call must act in concert so that commands issued over RF channels 111 and 112 are consistent with each other. In order to accomplish this consistency, one of the serving Base Station Subsystems may operate as the primary base station subsystem with respect to the other serving Base Station Subsystems. Of course, a communiqué wireless subscriber device MS may communicate with only a single Base Station Subsystem if determined as sufficient by the cellular communication network.

Cellular communication networks provide a plurality of concurrently active communications in the same service area, with the number of concurrently active communication connections exceeding the number of available radio channels. This is accomplished by reusing the channels via the provision of multiple Base Station Subsystems 131-151 in the service area that is served by a single Mobile Telephone Switching Office 106. The overall service area of a Mobile Telephone Switching Office 106 is divided into a plurality of "cells", each of which includes a Base Station Subsystem 131 and associated radio transmission tower 102. The radius of the cell is basically the distance from the base station radio transmission tower 102 to the furthest locus at which good reception between the communiqué wireless subscriber device MS and the radio transmission tower 102 can be effected. The entire service area of a Mobile Telephone Switching Office 106 is therefore covered by a plurality of adjacent cells. There is an industry standard cell pattern in which sets of channels are reused. Within a particular cell, the surrounding cells are grouped in a circle around the first cell and the channels used in these surrounding cells differ from the channels used in the particular cell and from each of the other surrounding cells. Thus, the signals emanating from the radio transmission tower in the particular cell do not interfere with the signals emanating from the radio transmission towers located in each of the surrounding cells because they are at different radio frequencies and have different orthogonal coding. However, in the case of soft handoff, the frequencies must be the same for all cells involved in the soft or softer handoff process. In addition, the next closest cell using the transmission frequency of the particular cell is far enough away from this cell that there is a significant disparity in signal power and therefore sufficient signal rejection at the receivers to ensure that there is no signal interference. The shape of the cell is determined by the surrounding terrain and is typically not circular, but skewed by irregularities in the terrain, the effect of buildings and vegetation and other signal attenuators present in the cell area. Thus, the cell pattern is simply conceptual in nature and does not reflect the actual physical extent on the various cells, since the implemented cells are not hexagonal in configuration and do not have precisely delimited boundary edges.

The control channels that are available in this system are used to setup the communication connections between the communique wireless subscriber devices 101 and the Base Station Subsystem 131. When a call is initiated, the control channel is used to communicate between the communiqué wireless subscriber device MS involved in the call and the local serving Base Station Subsystem 131. The control messages locate and identify the communiqué wireless subscriber device MS, determine the dialed number, and identify an available voice/data communication channel consisting of a pair of radio frequencies and orthogonal coding which is selected by the Base Station Subsystem 131 for the communication connection. The radio unit in the communiqué wireless subscriber device MS re-tunes the transmitter-receiver equipment contained therein to use these designated radio frequencies and orthogonal coding. Once the communication connection is established, the control messages are typically transmitted to adjust transmitter power and/or to change the transmission channel when required to handoff this communiqué wireless subscriber device MS to an adjacent cell, when the subscriber moves from the present cell to one of the adjoining cells. The transmitter power of the communiqué wireless subscriber device MS is regulated since the magnitude of the signal received at the Base Station Subsystem 131 is a function of the communique wireless subscriber device transmitter power and the distance from the Base Station Subsystem 131. Therefore, by scaling the transmitter power to correspond to the distance from the Base Station Subsystem 131, the received signal magnitude can be maintained within a predetermined range of values to ensure accurate signal reception without interfering with other transmissions in the cell.

The voice communications between communiqué wireless subscriber device MS and other communique wireless subscriber devices, such as land line based communique wireless subscriber device 109, is effected by routing the communications received from the communiqué wireless subscriber device MS via switching network 106N and trunks to the Public Switched Telephone Network (PSTN) 108 where the communications are routed to a Local Exchange Carrier 125 that serves land line based communique wireless subscriber device 109. There are numerous Mobile Telephone Switching Offices 106 that are connected to the Public Switched Telephone Network (PSTN) 108 to thereby enable subscribers at both land line based communique wireless subscriber devices and wireless subscriber devices to communicate between selected stations thereof. This architecture represents the present architecture of the wireless and wireline communication networks. The present communique system for cellular communication networks 100 is shown connected to the Public Switched Telephone Network 108, the Mobile Telephone Switching Offices 106, as well as a data communication network such as the Internet 107, although these examples of interconnections are subject to an implementation selected by the purveyor of communique services and some of these connections can be eliminated as unnecessary for some implementations as described below.

Format of the Forward CDMA Channel

FIG. 3 illustrates in block diagram form a typical configuration of the Base Station Subsystem 131 to communiqué wireless subscriber device MS forward CDMA channel used in cellular communication networks. The typical Base Station Subsystem 131 to communiqué wireless subscriber device MS forward CDMA channel comprises a predefined bandwidth centered about a selected carrier frequency. The bandwidth of the selected channel as well as the selected carrier frequency is a function of the technical implementation of the Base Station Subsystem 131 of the cellular communication network and is not discussed further herein. The channel is typically divided into a plurality of segments: Pilot 301, Synchronization (Synch) 302, Paging 303, Traffic 304. The Paging 303 and Traffic 304 segments are further divided into a plurality of channels Ch1-Ch7 and Ch1-Ch55, respectively. Each traffic channel represents a communication space for a selected communiqué wireless subscriber device MS. The plurality of paging channels Ch1-Ch7 is available for the Base Station Subsystem 131 to page a selected communiqué wireless subscriber device MS in well-known fashion. In order to segregate these channels, each channel is assigned a selected one of the 64 Walsh codes, from W=0 to W=63. For example, the Pilot channel is assigned a Walsh code of W=0, while the Synch channel is assigned a Walsh code of W=32. The Paging channels Ch1-Ch7 are assigned Walsh codes of W=1-W=7, respectively. The remaining Walsh codes are assigned to the traffic channels CH1-CH55 as shown in FIG. 3. Each Traffic channel consists of data traffic 311 as well as in band signaling 312 transmitted from the Base Station Subsystem 131 to the communiqué wireless subscriber device MS.

As described herein, the overhead required in point to point cellular communications to manage hand-offs between cells within the cellular communication network is considerable and continuous, since many of the wireless subscriber devices served by the cellular communication network are mobile in nature. In the present communique system for cellular communication networks, the need for this overhead in processing call hand-offs is reduced since the wireless subscriber device is not provided with a unique communication link, but shares this link with many other wireless subscriber devices. There are a number of communique implementations that can be overlaid on this standard handoff process.

Philosophy of the Communique System

The terms "cell site" and "cell" are sometimes loosely used in the literature, and the term "cell site" generally denotes the locus, such as Base Station Subsystem 131, at which the radio frequency transmitter and receiver apparatus (Base Station Transceiver 133, 143, 144, 153) is located, while the term "cell" generally denotes the region of space which is served by a particular radio frequency transmitter-receiver pair which is installed in Base Station Transceiver 133 at Base Station Subsystem 131, and includes sectors of a particular cell where the cell comprises a plurality of sectors. The cells can also be the coverage area that is created by in-building wireless communication systems, private wireless networks, as well as dynamically configured wireless communication networks as described below.

The particular technology used to implement the communications between wireless subscriber devices and the radio frequency transmitter-receiver pairs as well as the nature of the data transferred there between, be it voice, video, telemetry, computer data, and the like, are not limitations to the communique system for cellular communication networks 100 or the communiqué wireless subscriber device which are described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated radio frequency transmitter-receiver pairs located at the cell site for each of these cells. In addition, the term "telecommunications cell" is used in the general sense and includes a traditional cell generated by a cell site as well as a sector of a cell, as well as a cell elevation sector, regardless of size and shape. In present and future wireless cellular architectures, there are different types of radio frequency communication interfaces. Each radio frequency communication interface has advantages and disadvantages but each radio frequency communication interface type is capable of conveying narrowcasted communiqués to communiqué wireless subscriber devices. The purpose and intent of the communiqué wireless subscriber device is to not create a wholly new platform for the conveyance of narrowcasted communiqués. Rather, the communiqué wireless subscriber device co-exists through novel systems concepts with present and future cellular architecture platforms in the content domain with minimal modification of the radio frequency communication interface. The communiqué wireless subscriber device is one element of many in the overlay architecture in the content domain and, while integrated with the radio frequency communication interface, is independent of the selected radio frequency communication interface.

The general types of radio frequency communication interfaces presently in use include:

FDMA (analog FM modulated carrier with Frequency Division Multiple Access)

CDMA (digital Code Division Multiple Access)

TDMA (digital Time Division Multiple Access)

Architectures that involve some elements of all three, such as GSM, which is a combination of FDMA and TDMA.

The communiqué wireless subscriber device, as noted above, can be any of a number of full function communication devices that include: WAP enabled cellular telephones, personal digital assistants, Palm Pilots, personal computers, and the like or special communique only communication devices that are specific to communique reception; or MP3 audio players (essentially a radio receiver or communique radio); or an MPEG4 video receiver (communique TV); or other such specialized communication device. The wireless subscriber devices can either be mobile wireless communication devices in the traditional mobile subscriber paradigm, or the fixed wireless communication devices in the more recent wireless product offerings. The preferred physical embodiments of the communiqué wireless subscriber device are end-user devices that are transportable or mobile. Other types of end-user devices include: Stationary and Fixed. Stationary communiqué wireless subscriber devices are relocatable, end-user devices that are often located in a home or business and remain in that location for an extended period of time. Fixed communiqué wireless subscriber devices are end-user devices that are permanently installed in structures, such as buildings. Some examples of these three types of communiqué wireless subscriber devices are:

1. Mobile communiqué wireless subscriber device: PDA, Cell Phone, Car Phone, Watercraft Phone, Aircraft Phone, Bus, MP3 players, Walkman, Personal CD Player, Laptop Computer and so on.

2. Stationary communiqué wireless subscriber device: Television, Clock Radio, Stereo, Boom Box, Desktop Computer, Telephone Handset and so on.

3. Fixed communiqué wireless subscriber device: Restaurant Loudspeaker System, Public Address Systems in Stores, Shopping Malls, Airports, Athletic Facilities, Schools, Colleges, Government Offices and so on (next generation Muzak).

The communiqué system for cellular communication networks operates with existing cellular communication networks, as described above, to provide other than strictly point to point communication services, which are collectively termed "communique services" herein, to subscribers. The Communique can be unidirectional (broadcast) or bidirectional (interactive) in nature and the extent of the Communique can be network-wide or narrowcast, where one or more cells and/or cell sectors are grouped to cover a predetermined geographic area or demographic population or subscriber interest group to transmit information to subscribers who populate the target audience for the narrowcast transmissions. For instance, the coverage region can be implemented in the radio frequency domain by using frequency assignments, code assignments or dynamically shaped antenna patterns. Pattern shaping is done now to manage capacity constraint issues (e.g. a cell size would be shaped/shrunk at busy hour with adjacent cells helping to carry a particular region's traffic). The communique system for cellular communication networks can use pattern shaping to create a narrowcast region for instance.

The communique system for cellular communication networks creates broadcast and/or narrowcast regions in a "virtual" manner. With this concept, the RF configuration is separable, in that it can be static in its architecture or it could be configured as described above in a dynamic manner. The "virtual" architecture is achieved in the content domain—a very powerful and flexible concept. By selectively enabling and disabling specific content on a cell-by-cell basis, a shaped broadcast or narrowcast can be realized from the end-user☐s perspective even though the RF configuration may have remained static or unchanged. This is a powerful narrowcast tool since it is relatively simple to dynamically change the specific content being transmitted at a given cell. The combinatorial effect is spatial and temporal in its extent even though the RF architecture may have been unchanged. The methods available to achieve this effect are similar to the zip code advertising systems used in cable TV transmissions wherein regional servers select, parse and reassemble content for a particular geographic region. The content management can also be done on a centralized basis.

The basic functionality of the communique system for cellular communication networks 100 comprises an information distribution management functionality that concurrently propagates information to a plurality of wireless subscriber devices, using push, pull and combinations of push/pull data propagation modes. The need for information dissemination is identified: in response to external events, in response to predetermined temporal/spatial stimuli; as a function of subscriber inquiries/requests; and the like. The communique system for cellular communication networks 100, in response to an identified information dissemination event, identifies a plurality of cells in the cellular communication network as well as available communication channels in each of these cells to carry the information that is to be transmitted to a plurality of wireless subscriber devices extant in the locales served by the selected cells. The communication channels can be dedicated to communique services or can be selected from the pool of available communication channels. The subscribers access the Communiques by selecting the communication channel on their wireless subscriber device that carries the Communique. The subscriber can be alerted to the presence of the Communique in many ways or can activate their wireless subscriber device to retrieve the Communique absent any alert being transmitted to the wireless subscriber device. The Communique retrieved by the subscriber is not subscriber-unique, in that the Communique is transmitted to many subscribers, with a plurality of subscribers concurrently accessing the Communique being a typical mode of operation. In addition, the bandwidth required for communique services can be variable, with unused channels of the existing cellular communication network being allocated on an as needed basis to communique services. Furthermore, the routine point to point cellular communication traffic can be load balanced with the communique services, with routine cellular traffic being preferentially served by cells that have unused capacity to thereby free up channels in other cells for communique services. In addition, the communique system for cellular communication networks 100 identifies the appropriate source of information available from a program source that is to be used to constitute the communique service. The information can be a predetermined continuous feed, or can be comprised of a plurality of segments that can be interspersed with advertisements, other information segments and the like.

Communiqué Wireless Subscriber Devices

Communique wireless subscriber devices MS are end-user devices (such as wireless subscriber devices 101) that are capable of receiving narrowcasted content from broadband cellular networks that deploy next generation architectures such as WCDMA (Wideband Code Division Multiple Access), CDMA2000, HDR (High Data Rate) and so on. This narrowcasted content (communiqué) is multimedia in nature and simultaneously delivered to multiple communique wireless subscriber devices. The narrowcasted content includes:

audio (music, radio shows, news and the like), video (MTV-like videos, news, live traffic cams and the like), and data (text information, stock quotes, graphical information and the like).

The end-user devices, herein now called communique wireless subscriber devices MS, are, in essence, next generation radio-television-internet receivers for generally unidirectional receipt of transmissions that have a highly targeted demographic focus. The above-noted content are conveyed by Radio Frequency transmissions with the preferred delivery means being next generation, or third generation (3G), wireless cellular systems in a one-to more than one broadcast or narrowcast mode of operation. The demographic groups used for narrowcasting can range in size from a small neighborhood to a sports stadium as determined by the granularity of the cellular architecture being re-used to deliver the narrowcasted content. The content delivery region and conveyed content are dynamically changeable depending on the associated demographics.

Communiqué wireless subscriber devices are multi-media devices and, as such, output digital content to the end-user in the following forms:

Digital Audio
Digital Video
Digital Internet
Digital Text
Digital Graphics

The architecture of a communique wireless subscriber device is derived from modifications to existing and planned cellular radio architectures. The implementation of Narrowcast/Communique capability is largely performed in software/firmware with the wireless radio frequency communication interface remaining very similar to present and future standards. In essence, the architecture is a novel systems overlay leveraging what already exists.

The present wireless architecture paradigm of circuit switched calls with the connection being exclusively between two single network nodes is obsolete in the narrowcasting mode of operation. Narrowcasting enables a cellular architecture to convey information or content to multiple communiqué wireless subscriber devices at the same time. In order to do this, two general systems problems must first be resolved:

Multiple communique wireless subscriber device Addressing

Handoffs in a Unidirectional Narrowcast.

These issues are discussed below.

Figure 9:
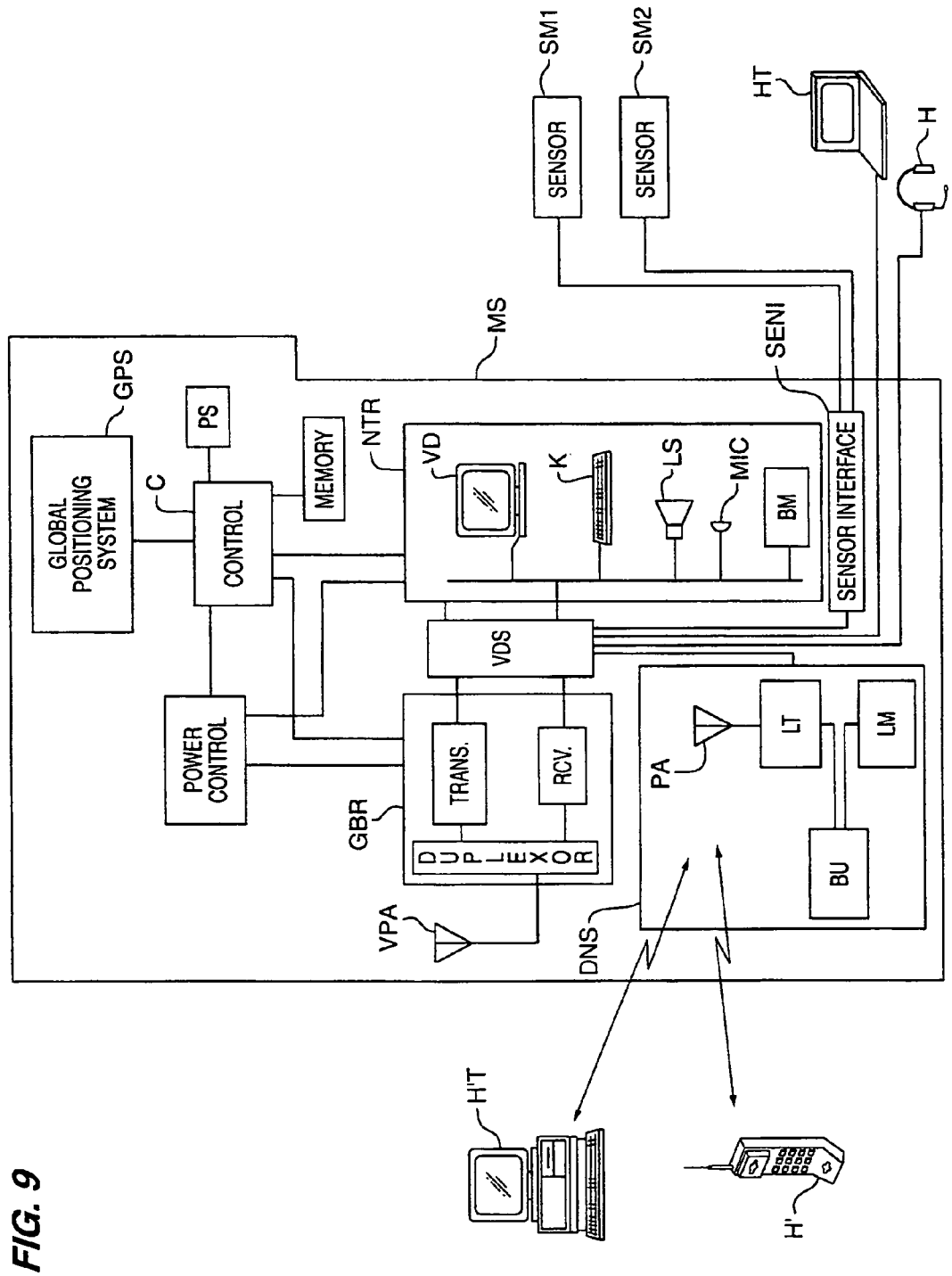
FIG. 9 illustrates in block diagram form the overall architecture of a communiqué wireless subscriber device.

FIG. 9 illustrates, in block diagram form, the architecture of a typical embodiment of the communique wireless subscriber device MS of the present invention. This particular embodiment of the communique wireless subscriber device MS is disclosed to illustrate the concepts of the invention and is not intended to limit the application of the disclosed concepts. The communiqué wireless subscriber device MS is equipped with a processor CONTROL that operates pursuant to instructions that are stored in MEMORY and the subscriber profile information stored in profile memory PS, as is described below. In this particular application, the communique wireless subscriber device MS can also contain mobile unit location apparatus, such as global positioning system GPS, to produce an indication of the location of the communique wireless subscriber device MS.

The communique wireless subscriber device MS is equipped with transmitter TRANS and receiver RCV circuits well known in cellular communications for providing voice and data communications via a voice data switch VDS. The apparatus also includes antenna VPA, which is typically mounted on an exterior surface of the communique wireless subscriber device MS and coupled in well known fashion to the transmitter TRANS and receiver RCV circuits by a duplexor. The power output of the transmitter TRANS can also be dynamically regulated as a finction of the distance from the cell site transmitter antenna to ensure a relatively constant signal level, using the Power Control circuit presently available in many cellular radio systems.

The communiqué wireless subscriber device MS includes a user interface NTR that is equipped with the apparatus necessary to enable the user to receive and input data. For example, the user interface NTR includes a display device VD that produces a human sensible visualization of the data that is received and audio output device LS to produce a human sensible audio output of the received data. The user interface can also include audio input devices MIC and keyboard K (and/or mouse or pointer device) to enable the user to input data in an audible or textual form, respectively. The user interface NTR can optionally include a biometric interface BM that measures an immutable physical characteristic of the user, such as a fingerprint, retina scan, and the like, to enable the communiqué wireless subscriber device MS to authenticate the identity of the user. In addition, the communiqué wireless subscriber device MS can include sensors, or an interface SENI that is adapted to connect to one or more sensors SM1, SM2, to measure selected parameters, such as ambient temperature, velocity, altitude, and the like.

In the case of a receive-only communiqué wireless subscriber device, it is evident that the implementation described above can be simplified, since the transmitter TRANS is not needed and many of the other capabilities, such as a Global Positioning System and the like are likely not required.

Dynamically Configured Wireless Local Area Networks

There is presently an effort to manufacture wireless subscriber devices that are interoperable, via short-range, low power communications. These wireless subscriber devices are formed into a small wireless network on an ad hoc basis. Each wireless subscriber device seeks out and configures itself with a resident server device, which can be a permanent access point that is interconnected for example with the communiqué system for cellular communication networks 100 or another wireless subscriber device.

An example of such a philosophy is presently embodied in the Bluetooth Special Interest Group which uses a wireless paradigm for interoperability of devices using a carrier frequency of between 2,400 MHz and 2,483.5 MHz to support a plurality of data transfer channels, which are either asymmetric or symmetric, as a function of the application that is enabled. The communiqué wireless subscriber device MS therefore can include a dynamic network system DNS that includes a local radio frequency (RF) transceiver LT, a baseband link control unit BU, associated link management control software/hardware LM and an antenna system PA. The transmitter portion of the local radio frequency transceiver LT mixes the baseband information with the frequency hopping local oscillator to generate a frequency-modulated carrier. The receiver portion of the local radio frequency transceiver LT down converts and demodulates the RF signal using the same oscillator in the adjacent time slot. The local radio frequency transceiver LT supports both point-to-point and point-to-multi-point connections. A plurality of wireless subscriber devices so enabled can dynamically configure themselves into a "piconet", with one wireless subscriber device designated as the master and the remaining units as slaves, or a peer-to-peer configuration. The piconet is distinguished from other similar piconets in the vicinity by the frequency hopping sequence. The baseband protocol can be used for both circuit and packet switched transmissions. Synchronous links can be established for voice connections, using reserved time slots, while asynchronous links are dedicated for data transmissions.

For example, the dynamic network system DNS may be used to serve a single auxiliary handset unit H and/or terminal device HT and can optionally be multiplexed to serve a plurality of auxiliary handset units H, H' and/or terminal devices HT, HT'. The auxiliary handset H and/or terminal device HT can be hard wired to the communiqué wireless subscriber device MS or can be a wireless unit H', HT' of limited communication range that interconnects with the communiqué wireless subscriber device MS via radio frequency transmissions as noted above. In the multi-user application, the communiqué wireless subscriber device MS can comprise a "mini-cell" wherein the various auxiliary handsets H, H' and/or terminal devices HT, HT' are managed by the communiqué wireless subscriber device MS in a manner analogous to that performed by the typical cell site/MTSO. Thus, the handset units H, H' and/or terminal devices HT, HT' can be of a different technology, with the communiqué wireless subscriber device MS performing an integration function as well as the multiplexing function. The handsets H, H' can be personal communication system (PCS) units, pagers, code division multiple access (CDMA) units, or any other wireless communication devices which are in use by individuals. The communiqué wireless subscriber device MS receives the signals generated by the various handset units and formats (if necessary) the data contained in these transmissions into the format used for the radio link transmissions to the cell site. The communications in the reverse direction are managed in a complementary manner as is well known. The handset units H, H' can each have a unique identification which enables the underlying cellular communication network to communicate with the unit. The communiqué wireless subscriber device MS can therefore perform the handset registration function by polling the handset units extant in the space served by the electronics unit to thereby identify these units. This unit identification data can then be transmitted to the cell site via the control channels to enable the cellular network to ascertain the location of these particular units.

Communiqué Wireless Subscriber Device—CDMA System Features

In addition to the above-noted characteristics of the communique wireless subscriber device MS, there is an alternative cellular communication system termed Code Division Multiple Access (CDMA) which transmits a plurality of communications on each channel and differentiates the various communiqué wireless subscriber devices MS by the code assigned to each communiqué wireless subscriber device MS. These CDMA systems transmit multiple conversations on the same frequency. In order to maintain the overall system noise level at a minimum, the power level of the various communiqué wireless subscriber devices MS must be precisely controlled. With a typical CDMA system, 64 Walsh codes are used to differentiate among the wireless subscriber devices served by a cell site and a predetermined number of these codes can be reserved for the exclusive use by communique wireless subscriber devices MS, since generally all of these codes are not all are used in a typical ground-based cell site. Thus, the code separation in a CDMA system can be used to prevent the interference between communique wireless subscriber devices MS and the conventional ground-based wireless subscriber devices and their cell sites. In conjunction with unique Walsh code assignments, the network can also assign unique ☐Wide Area☐ code words to identify a virtual network overlay.

The data communication capability of the communique wireless subscriber device MS can be enhanced by increasing the bandwidth of the communication connection that is established with the cell site. There are a number of ways to provide an increased bandwidth, including allocating multiple communication channels to the data communication function. Thus, a single call connection for data communication purposes comprises multiple physical communication channels managed in parallel to thereby multiply the data communication capacity associated with a single channel in the system. Alternatively, dedicated data communication channels can be allocated in the defined communication space, with the data communication channels occupying the bandwidth of multiple voice communication channels. In either case, the data communication capability of the communique wireless subscriber device MS can be adapted to suit the needs of the subscriber.

An example of this is the connection of another terminal device, such as personal computer HT equipped with a modem, to the communiqué wireless subscriber device MS to thereby enable the user to transmit and receive data over the cellular voice communication connection, as is well known. The data can include facsimile transmissions, E-Mail, data files and the like. Additionally, the terminal device HT can include a video display and the data displayed thereon can be entertainment/informational programs that are uploaded from the cell site or a source connected to the communique wireless subscriber device MS via a cellular communication connection.

Communiqué Services in Cellular Communication Networks

As can be seen from the above description, the transceiver GBR of the communiqué wireless subscriber device MS listens for the strongest pilot signal in one of the available communication channels and uses this pilot signal to derive a time/frequency reference. The communiqué wireless subscriber device MS then demodulates the synch signal for this communication channel to precisely align the clock of the communiqué wireless subscriber device MS with that contained in the Base Station Subsystem 131. For a broadcast mode of operation, the communiqué wireless subscriber device MS must be given information that identifies which PN codes are broadcast/narrowcast signals for this communication channel. This can be accomplished by transmitting directory information to the communiqué wireless subscriber device MS in the pilot or synch signals or by using a predefined PN code for selected broadcast signals. Since the cellular communication network continuously transmits the Communiqué signals from various cell sites, there is no statistical reduction of self-interference. Therefore, proper selection of frequencies for transmission and PN codes is necessary to reduce interference. Each PN code space can contain either a single transmission or can be used in a multiplex mode where multiple signals are transmitted. In the latter mode, time slotted baseband data is streamed on a single CDMA waveform by the creation of multiple subchannels in each frame of the transmission. In this manner, lower data rate signals can share a single transmission.

The Mobile Telephone Switching Office 106, in conjunction with the VLR and HLR, helps to manage the registration process that includes subscriber authorization. The Visitor Location Register 161 and the Home Location Register 162 are essentially sophisticated databases that are hooked to the Mobile Telephone Switching Office 106. The VLR and HLR are sometimes the same device with logical functional partitions although VLRs can stand alone and can be distributed in their deployment while HLRs are typically more centralized. The Communiqué Location Register (CLR) 163, is the apparatus in the communiqué system for cellular communication networks 100 where all of the systems information for subscribers' authorization and service plans reside. This has substantial merit in terms of practical implementation since it can be a wholly separate device that connects to the Mobile Telephone Switching Office 106 or as an integral part of the communiqué system for cellular communication networks 100. The Communiqué Location Register 163 is attached to the Mobile Telephone Switching Office 106 in a manner similar to the HLR/VLR.

In order to describe the various services that are available from the communiqué system for cellular communication networks 100, the terms used to describe the processes operational in the recognition of a subscriber and provision of service to a subscriber must be defined. "Acquisition" is the process where the communiqué wireless subscriber device MS scans for pilots, locks onto synch channels and has all system based knowledge necessary to know where and how to receive Communiqués. "Registration" is the process that entails the interchange of information between the communiqué wireless subscriber device MS and the cellular communication network wherein the cellular communication network becomes aware of and knows which subscribers are receiving Communiqués and where they are receiving them. "Authorization" is the process where the communiqué system for cellular communication networks 100 grants end-user access to broadcast or narrowcast content to one or many subscribers in a general or specific location. Thus, a "free" communiqué service has the ACQUISITION process but does not have REGISTRATION or AUTHORIZATION processes. "Subscription" communiqué services have all three processes. "Pre-pay" communiqué services have a modified ACQUISITION process but do not include REGISTRATION or AUTHORIZATION processes. Therefore, the term "autonomous" can be used to describe the "free" broadcast architecture, since the cellular communication network does not know who is listening or where they are listening. This is the equivalent of today's broadcast radio and TV with the exception that the content can be specialized into "free" narrowcasts that have a limited spatial extent which can be dynamically managed. The communiqué wireless subscriber device MS used for such a communiqué service can be a one-way receive only (ultra-low cost) communiqué wireless subscriber device MS. For a communiqué service that includes free broadcasts and subscription services, the communiqué wireless subscriber device MS is not content interactive, meaning communiqué services such as request-reply are not available. The communiqué wireless subscriber device MS is two-way in terms of its communication capability with the network for registration and authorization purposes. A Pre-pay Subscription communiqué service is conceptually similar to the digital TV recorders that have a one-time-only pre-pay subscription fee. This concept uses a modified forward paging channel to provide initialization information for traffic channels and then uses in-band signaling on the forward traffic channel to convey systems information.

Addressing of Communiqué Wireless Subscriber Devices

First, a method is needed to "spoof" or fool the existing cellular communication system into sending content to more than one user at a time. Or, in other words, what is needed is an addressing scheme that is consistent with present and future practice but transcends the traditional circuit switched one-to-one architecture. Multiple methods of communiqué wireless subscriber device addressing are possible but one approach stands out as being least invasive in terms of architecture modification. While this method is the preferred approach, it is by no means the only method.

The preferred embodiment is through the creation of a common MIN or Mobile Identification Number. This universal MIN is deployed ubiquitously across all communique wireless subscriber devices. The universal narrowcast MIN enables all communique wireless subscriber devices to receive all content wirelessly conveyed to the communique wireless subscriber device. This universal MIN is stored in profile memory PS of the communiqué wireless subscriber device MS to thereby enable this device to access the services to which it is authorized. In addition, the universal MIN can be used as a filter, where the communiqué wireless subscriber device MS receives the content, but this does not necessarily mean the end-user has access to it. The universal MIN acts as a portal key merely enabling the narrowcasted content to pass through, as regulated by the subscriber profile information and subscription authorizations stored in profile memory PS and executed by the processor CONTROL. The universal MIN does not determine whether the end-user has usable access to the narrowcasted content. Content access is determined through other means to include a hierarchical subscription type of model. A hierarchical content subscription service ranges from free to subscription access to pay-perreceipt (pay-per-listen, pay-per-view). Only specific types of communique wireless subscriber devices are capable of hierarchical content subscriptions since this requires a means for authorized access. One method involves a pre-paid form of lifetime subscription (which doesn't require a bi-directional communiqué wireless subscriber device); another is a method for the communique wireless subscriber device to interact with the networks billing/authorization systems to enable end-user access to specific types of services (this is a bi-directional communiqué wireless subscriber device).

Handoff of Communiqué Wireless Subscriber Devices

Second, a method is needed to enable a one-way communiqué wireless subscriber device to coordinate its activities as required with the network. In particular, a method to enable handoffs is necessary to provide for seamless coverage. Handoffs can take the following forms:

Soft (communique wireless subscriber device receives from multiple cells simultaneously on the same frequency but different Walsh codes)

Softer (communique wireless subscriber device receives from multiple sectors of a given cell on the same frequency but different Walsh codes)

Hard (communique wireless subscriber device receives from only one cell at a time on a given frequency and then switches frequencies as the handoff occurs to a new cell)

Digital CDMA architectures use all three types of handoffs while Analog FDMA and Digital TDMA are only capable of hard handoffs. From an architecture perspective then, by solving the handoff problem for CDMA, the general handoff problem is solved for Analog and TDMA since the methods and concepts to perform a hard handoff on a CDMA platform are similar to what is done in Analog and TDMA architectures.

Types of Communique Wireless Subscriber Devices

When evaluating the two predominant issues, addressing and handoffs, they must be considered in the context of the types of communiqué wireless subscriber devices that are possible, as noted in the following list.

1. One Way Narrowcast Reception, Incapable of Bi-Directional Administrative Systems Overhead ("Receive Only").

2. One Way Narrowcast Reception, Capable of Bi-Directional Administrative Systems Overhead ("Receive Only, Two-way Admin Overhead").

3. Two Way Narrowcast Reception/Transmission, Capable of Bi-Directional Administrative Systems Overhead ("Transmit/Receive, Two-way Admin Overhead").

While the narrowcast architecture is predominantly one-way from the source to the communiqué wireless subscriber devices, bi-directional communiqués are also possible. The last type of communique wireless subscriber device listed above has this capability.

Each communiqué wireless subscriber device type has a different type of network Registration—the process under which it becomes "connected" to the network. This is different from the Authorization process described previously which enabled access to a particular type of content or narrowcast service. As previously described, the processes herein are for a CDMA architecture which is more complex in terms of its management of communique wireless subscriber devices particularly for the types of hand-offs required. The registration processes for an analog or TDMA or hybrid type of architecture are similar in concept and while the other methods are not described in detail here, the conceptual extension to the other architectures (analog/TDMA/hybrid) are well understood by those in the industry.

Unidirectional Transmission Without Subscriber Registration

There are numerous possible architectures that can be used to transmit information to the wireless subscriber devices with the architecture selected having an impact on the types of transmissions.

FIG. 4 illustrates in block diagram form a typical assignment of cells in a cellular communication network for a unidirectional transmission without subscriber registration mode of operation of the present communiqué system for cellular communication networks 100, where a plurality of cells are transmitting Communiqué signals, with each cell using the same frequency and the same Walsh (PN) code for a selected Communiqué. There is a K=3 cell repeat pattern, although alternatively, the cells can be subdivided into three sectors for the same effect. In this manner, the communiqué wireless subscriber device MS does not have to search for the desired Communiqué, since the location is uniform throughout the cellular communication network. The communiqué wireless subscriber device MS is always in soft handoff mode and in the example of FIG. 4, the PN code varies by cell according to the K=3 repeat pattern, so the communiqué wireless subscriber device MS maintains a soft handoff mode with the three PN codes, regardless of the location of the communiqué wireless subscriber device MS in the cellular communication network. Existing wireless subscriber devices are equipped with three receivers in the rake receiver system that enables operation in this mode.

Figure 6:
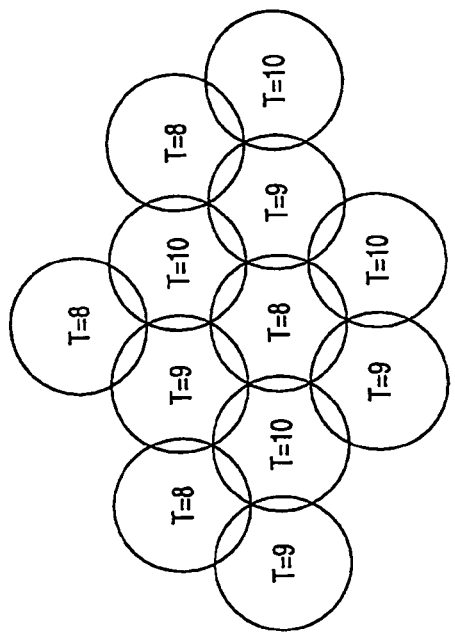
FIG. 6 illustrates in block diagram form a typical assignment of cells in a cellular communication network as an example of the operation of the present communique system for cellular communication networks.

Alternatively, adjacent cells (or cell sectors) can transmit the Communiqué signals on different frequencies, but this requires additional complexity in the wireless subscriber device, since the handoff must occur with both frequency and PN code making it a hard handoff. In addition, the lack of uniformity in the transmission frequency requires the wireless subscriber device to receive information from the base station to identify the location of the desired Communiqué in order to enable the wireless subscriber device to lock on to the appropriate combination of frequency and PN code for each cell. One way of avoiding the complexity is illustrated in FIG. 6 where there is a grouping of K=3 for the cells and the Walsh code assignment is static, using a specific Walsh code for each of the K=3 cells, such as Traffic channel 8 (Walsh code W=8) for the cell K=1 and Traffic channel Ch9 (Walsh code W=9) for the cell K=2 and Traffic channel Ch10 (Walsh code W=10) for cell K=3. Therefore, the subscriber does not need additional information from the cellular communication network to receive the broadcast information, since the communiqué wireless subscriber device MS has 3 RAKE receivers, which can each be locked on to one of the three Walsh codes W=8-W=10 used in the K=3 repeat scenario. The communiqué wireless subscriber device MS can always be in a soft handoff mode to ensure that continual reception of the transmission takes place as the communiqué wireless subscriber device MS receives signals from the three predetermined Traffic channels.

For the "Receive Only" type of communique wireless subscriber device, the following FIG. 2 describes the preferred registration algorithm although others are certainly possible (IS95 architecture adaptation). This is described as an Autonomous Registration since the network is unaware of the communique wireless subscriber device activity and the communique wireless subscriber device is incapable of communicating with the network.

FIG. 2 illustrates in flow diagram form the operation of a typical cellular communication system in implementing an idle handoff mode of operation. An idle handoff occurs when a communiqué wireless subscriber device MS has moved from the coverage area of one Base Station Subsystem 131 into the coverage area of another Base Station Subsystem 141 during the Wireless Station Idle State. As shown in FIG. 2, at step 201, the communiqué wireless subscriber device MS scans for pilot signals for the base stations that serve the coverage area in which the communiqué wireless subscriber device MS is operational. If the communiqué wireless subscriber device MS detects a Pilot channel signal from another Base Station Subsystem 141, that is sufficiently stronger than that of the present Base Station Subsystem 131, the communiqué wireless subscriber device MS determines that an idle handoff should occur. Pilot channels are identified by their offsets relative to the zero offset pilot PN sequence and typically are the Walsh Code 0 for each channel. The communiqué wireless subscriber device MS at step 202 groups pilot offsets into sets describing their status with regard to pilot searching. The following sets of pilot offsets are defined for a communiqué wireless subscriber device MS in the Wireless Station Idle State. Each pilot offset is a member of only one set.

Active Set: The pilot offset of the Forward CDMA Channel whose Paging channel is being monitored.

Neighbor Set: The offsets of the Pilot channels that are likely candidates for idle handoff. The members of the Neighbor Set are specified in the Neighbor List Message, Extended Neighbor List Message, and the General Neighbor List Message.

Remaining Set: The set of all possible pilot offsets.

In the process of FIG. 2, the communiqué wireless subscriber device MS at step 203 selects the 3 strongest pilot signals for use in establishing/maintaining the cellular communication connection. In this process, the RAKE receiver in the communiqué wireless subscriber device MS at step 207 continuously looks for the strongest pilot signals to ensure the continuation of the cellular communication connection. The communiqué wireless subscriber device MS at step 204 decodes the pilot signals and locks on to the synch channel of selected forward CDMA channels having the strongest pilot signals.

At step 205, the communiqué wireless subscriber device MS switches to selected Traffic channels, one per selected forward CDMA channel as determined by a communiqué identifier stored in the profile memory PS and demodulates the signals received therein and at step 206 outputs the demodulated multi-media output to the appropriate devices of the user interface NTR of the communiqué wireless subscriber device MS for use by the subscriber.

As described herein, the overhead required in point to point cellular communications to manage hand-offs between cells within the cellular communication network is considerable and continuous, since many of the wireless subscriber devices served by the cellular communication network are mobile in nature. In the present communiqué system for cellular communication networks, the need for this overhead in processing call hand-offs is reduced since the wireless subscriber device is not provided with a unique communication link, but shares this link with many other wireless subscriber devices. There are a number of communiqué implementations that can be overlaid on this standard handoff process.

Specific attributes of the Autonomous Registration Cycle for the "Receive Only" communique wireless subscriber device include:

1. Adjacent cell pilots are W=0 (Walsh Code zero) but have unique sequence offsets to identify a particular base station from other base stations.

2. The synchronization or synch channels have the same offset as the pilot.

3. The static traffic channels conveying the narrowcasted content are always fixed within the network deployment using a K=3 algorithm. The communique wireless subscriber devices are pre-programmed to know which code sequence to look for (a priori knowledge of where the narrowcast resides).

4. Communique wireless subscriber devices are in continual soft or softer handoff.

5. All Walsh code assignments are static.

6. K=3 can be an omni cell grouping or a sector grouping.

7. Forward Paging Channels are not used.

8. Traffic Channel carries content and network overhead (as an in-band signaling protocol).

Non-Interactive Bi-Directional Transmission with Subscriber Registration

Figure 7:
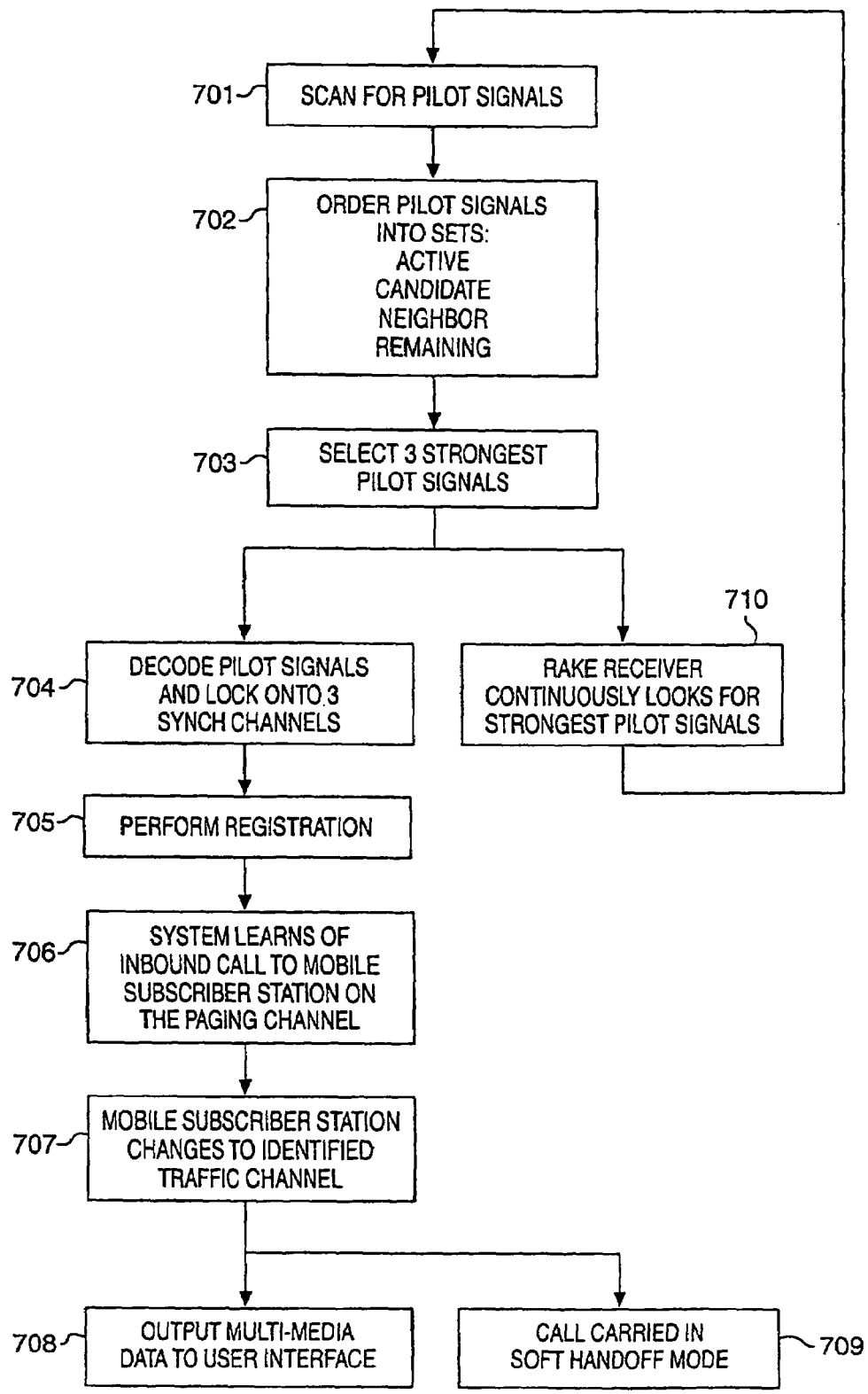
FIG. 7 illustrates in block diagram form a typical assignment of cells in a cellular communication network for a non-interactive bidirectional transmission with subscriber registration mode of operation of the present communique system for cellular communication networks.

FIG. 7 illustrates in block diagram form a typical assignment of cells in a cellular communication network for a non-interactive bidirectional transmission with subscriber registration mode of operation of the present communique system for cellular communication networks 100, where a plurality of cells are transmitting Communique signals, with each cell using any frequency and any Walsh (PN) code for a selected Communique. This mode of operation enables the cellular communication system to select any repeat pattern of cells, any assignment of Walsh codes for a transmission to thereby enable communique services. The communiqué wireless subscriber device MS communicates with the Base Station Subsystem 131 for channel assignment spoofed registration purposes to receive free communique services. Thus, the communiqué wireless subscriber device MS does not require a unique MIN for this free communique services mode of operation, since billing or authorization is not required. This mode of operation can also be described as a receive-only mode of content delivery, with a bidirectional communication channel administration capability.

However, for subscription services, as shown in FIG. 7, at step 701, the communiqué wireless subscriber device MS scans for pilot signals from the Base Station Subsystems that serve the coverage area in which the communiqué wireless subscriber device MS is operational. If the communiqué wireless subscriber device MS detects a Pilot Channel signal from another Base Station Subsystem 141, that is sufficiently stronger than that of the present Base Station Subsystem 131, the communiqué wireless subscriber device MS determines that an idle handoff should occur. Pilot Channels are identified by their offsets relative to the zero offset pilot PN sequence and typically are the Walsh Code 0 for each channel. The communiqué wireless subscriber device MS at step 702 groups pilot offsets into sets describing their status with regard to pilot searching. The communiqué wireless subscriber device MS at step 703 selects the 3 strongest pilot signals for use in establishing/maintaining the cellular communication connection. In this process, the RAKE receiver in the communiqué wireless subscriber device MS at step 710 continuously looks for the strongest pilot signals to ensure the continuation of the cellular communication connection. The communiqué wireless subscriber device MS at step 704 decodes the pilot signals and locks on to the synch channel of the 3 selected forward CDMA channels having the strongest pilot signals.

At step 705, the communiqué wireless subscriber device MS registers with the Base Station Subsystem 131 using their unique EIN and SSD, but a common MIN that is used for communique purposes to spoof the base station subsystem 131 into recognizing the communiqué wireless subscriber device MS without requiring a unique identity for the communiqué wireless subscriber device MS. In addition, the fraud prevention system (software) in the Mobile Telephone Switching Office 106 is disabled for Communiques MINs since the fraud system rejects multiple simultaneous MINs at different geographic locations. This feature is designed to prevent cloning fraud (more of an artifact for analog versus digital) although multi-MIN fraud detection is used in digital systems as well. The Base Station Subsystem 131 verifies the authorization of this communiqué wireless subscriber device MS to receive the requested service, identifies the inbound call to the communiqué wireless subscriber device MS (shared by potentially many wireless subscriber devices) at step 706 via the Paging channel used by the communiqué wireless subscriber device MS to request this service and, in response to control signals received by the communiqué wireless subscriber device MS from the Base Station Subsystem 131, the communiqué wireless subscriber device MS at step 707 changes to the identified traffic channel that carries the selected Communique. The communiqué wireless subscriber device MS at step 709 remains in a soft handoff mode to ensure uninterrupted reception of the Communique and also at step 708 outputs the received multi-media data to the user.

In this scenario, the issue of "push/pull" transmissions was not mentioned. The subscriber at communiqué wireless subscriber device MS can receive "push" data transmissions from a source which are directed to all subscribers of this service by the base station flood paging the MIN associated with this Communique. Thus, the communiqué wireless subscriber device MS would potentially have multiple MINs, with one for point to point traditional cellular communications and one for each of the communique services to which the subscriber enrolls. Alternatively, the communiqué wireless subscriber device MS can have a single MIN that includes a Communique address embedded in the application layer of the application software of the communiqué wireless subscriber device MS that filters the content received by the communiqué wireless subscriber device MS. This filter function distributes the Communique access control to the communiqué wireless subscriber device MS to thereby allow the subscriber to access only portions of the MIN enabled received content. Thus, when the communiqué wireless subscriber device MS is active in the service area, the flood page of one of the subscriber's MINs on the paging channel alerts the subscriber of the presence of a Communique transmission. The subscriber can activate communiqué wireless subscriber device MS to receive this transmission or can reject the transmission by operating appropriate buttons on the communiqué wireless subscriber device MS. The reverse path on this communique channel is disabled, since there are many subscribers simultaneously registering for the Communique.

The Mobile Telephone Switching Office 106, Base Station Controller (BSC) 132, 142, 152 and Base Station Transceiver (BST) 133, 143, 144, 153 need appropriate software and control revisions to not alarm or error when no reverse path transmission on the traffic channel is received from the communique device (mobile or fixed). For the provision of subscription or toll services via the non-interactive bidirectional transmission with subscriber registration mode of operation of the present communique system for cellular communication networks 100, a plurality of cells transmit Communique signals, with each cell using any frequency and any Walsh (PN) code for a selected Communique. This mode of operation enables the cellular communication system to select any repeat pattern of cells, any assignment of Walsh codes for a transmission to thereby enable not only free communique services but also subscription services. The communiqué wireless subscriber device MS communicates with the base station 102 for registration purposes, but does not enter an interactive mode once registration is accomplished. Thus, the communiqué wireless subscriber device MS does not require a unique MIN for this mode of operation, since the subscription billing and authorization can be implemented using the ESN and/or SSD of the communiqué wireless subscriber device MS or other such unique identifier.

The difference with this process compared to that of FIG. 2 is that the registration process of step 705 consists of the communiqué wireless subscriber device MS transmitting the spoofing MIN as well as the SSD and/or ESN to the Base Station Subsystem 131 in a brief data exchange on the reverse CDMA paging channel to log the subscriber in to the selected subscription or toll services. If required, the subscriber can use the biometric device MU to authenticate the purchase of services, since the immutable physical characteristic measured by the biometric device BU guarantees the identity of the subscriber. The forward page to the communiqué wireless subscriber device MS can include the Traffic channel identification of the subscribed services and the communiqué wireless subscriber device MS responds on the reverse CDMA channel with the subscriber registration information. Much of the communications to effect soft handoff and registration can be carried in-band on the reverse CDMA channel.

To summarize, some of the attributes of this particular embodiment include:

1. Walsh assignments can be dynamic. This provides flexibility in planning and deploying the network.

2. Not constrained to K=3 architectures. This enables improved management of self-interference.

3. The system manages handoffs: soft, softer and hard.

4. Enables subscription types of narrowcast services.

5. Supports free narrowcasts.

6. Does not support interactive narrowcasts.

7. Can do a hard handoff if necessary.

The following are architectural features of this topology:

1. All communiqué wireless subscriber devices have the same MIN

2. Subscription billing/authorization is done through means other than the MIN by using other unique identifiers such as the ESN (Electronic Serial Number) or SSD (Shared Secret Data). Alternatively, a NID (Narrowcast ID) could be created however this doesn't exist today.

3. Base Station Subsystems (BSS) are "spoofed" into thinking a call (inbound to the communiqué wireless subscriber device)is always in place and needs to always be added whenever requested.

4. Fraud prevention software needs to be "spoofed" also. Disable fraud software for a given MIN.

5. Minimize reverse access channel paging congestion by priority assignment less than circuit switched voice traffic.

6. "Continuous" flood page to a specified MIN on the forward paging channel. Flood page has lower priority than circuit switched call pages.

7. Overall objective is to minimize forward paging channel congestion. 8.

Disable reverse path traffic channel on communiqué wireless subscriber device and error/loss measurement of carrier software at BTS/BSC. The reverse path traffic channel is disabled because the system is incapable of supporting of very large numbers of simultaneously transmitting communiqué wireless subscriber devices on one reverse traffic channel.

Interactive Bi-Directional Transmission with Subscriber Registration

This type of communiqué wireless subscriber device has the highest level of functionality and complexity. It adds two-way communiqué capability to the "Receive Only, Two-Way Admin Overhead" communiqué wireless subscriber device described above. This capability can be termed "Two Way Narrowcast Reception/Transmission, Capable of Bi-Directional Administrative Systems Overhead" to emphasize the fact that the content transmission as well as the administrative information transmissions are bi-directional. The registration process for this communiqué wireless subscriber device MS is identical for that described above in FIG. 7 for the non-interactive transmission with subscriber registration, but the communiqué wireless subscriber device MS also has the capability to transmit data in the reverse direction, to the Base station Subsystem.

In essence, this communiqué wireless subscriber device MS is a fully functional cellular phone capable of receiving one-way communiqués in a blind radio like fashion (not transmit capable). It is also capable of receiving one-way communiqués with bi-directional administrative overhead capability for registration and channel assignment. And the final functionality is reverse path (mobile to base) communiqué capability. This reverse path communiqué capability can be implemented in a packet or circuit switched manner and can be coordinated or uncoordinated with respect to the one-way communiqué being transmitted from the base station. For instance, if a football game narrowcast (one-way from base to mobile) is taking place on a particular channel and the narrowcast region in this example is the stadium, individual subscribers can interact by sending back their vote for Most Valuable Player (MVP) on the reverse communiqué channel. In practice, the preferred method is to architect this channel in a packet switched mode enabling multiple end-users access on a demand basis using a variety of protocols such as aloha or slotted aloha. While it is possible to have the reverse communiqué channel be circuit switched, this architecture is not designed for thin route types of data transfer from large numbers of end-users.

In summary, the "Transmit/Receive, Two-way Admin Overhead" communiqué wireless subscriber device MS is a full function device capable of three modes of operation with the highest functionality being the mode wherein the device is capable of reverse path communiqués. The reverse path communiqué can have the same registered subscribers as the coincident forward path communiqué or the reverse path communiqué could have a unique narrowcast group. The communiqué group for reverse path (mobile to base) communiqués does not have to coincide with the communiqué assignments on the forward path (base-to-mobile). An example would be a college classroom where virtual learning is taking place (students are not in the classroom). The college professor, while conducting a live lecture, is able to "call-on" individual students by enabling their individual reverse path communiqué channel while disabling other students access. Similarly, communiqué auctions can occur where individual auction participants, or bidders, may have reverse communiqué access only when their pre-approved bid maximum is under the current bidding price. However, even when a bidder is no longer authorized to bid, the bidder receives the on-going auction live as a narrowcast to their audio/visual display.

Of importance, each communiqué wireless subscriber device MS now becomes a content source in a peer-to-peer architecture where each communiqué wireless subscriber device has the ability to send information to other users in its reverse path communiqué group. A classic example is the sharing of MP3 music files on a peer-to-peer OR peer-to-"narrowcast communiqué" group basis. This is a revolutionary paradigm that transcends traditional point-point architecture designs. One example is a teenager chat group. The forward path narrowcasted communiqué from the high school's Prom Committee may only be available at or near the high school. But, individual Prom Committee members can have their own narrowcast communiqué group where communication is bi-directional and only to those members who have authorized access.

Content Delivery

The content of the Communiques can vary widely and include but are not limited to: free information, subscription-based information, toll-based information, and the like, as noted above. The content can be locally generated or remotely generated, with the propagation of the information to the various cell sites being implemented in a number of ways. FIGS. 1A&1B illustrate in block diagram form the overall architecture of a typical content delivery network for the present communique system for cellular communication networks 100. In particular, there is a Program Manager 113 that functions to receive the program source information from multiple sources and migrate information to selected cell sites for transmission to the subscribers served by these cell sites. The Spatial-Temporal Content Manager 114 defines the geographic area or demographic population or subscriber interest group that are the metrics used to transmit information to subscribers who populate the target audience for narrowcast transmissions. The Spatial-Temporal Content Manager 114 also can include the selection of frequencies and PN codes that are used by each cell site to transmit the Communiques to subscribers. The basic content delivery network is independent of the existing radio frequency cellular communication network, but is cooperatively operative with the cellular communication network. Thus, it is expected that part of the functionality described herein for the content delivery network can be part of or integrated with the cellular communication network, as a matter of expediency. The degree to which the content delivery network is incorporated into the cellular communication network or even into the communique system for cellular communication networks 100 varies and does not diminish the applicability of the concepts embodied in the communique system for cellular communication networks 100.

As shown in block diagram form in FIGS. 1A & 1B, the sources of data for the communique system for cellular communication networks 100 can be varied, and a few typical content sources are shown here to illustrate the concepts of the communique system for cellular communication networks 100. In particular, the communique system for cellular communication networks 100 is connected to a plurality of content sources. The sources can be a remotely located program source for providing for example network news, such as a national network station 122 that is connected via a satellite uplink 123 and satellite 124 to a satellite downlink 126 and forwarded to satellite interface 117 that is part of the communique system for cellular communication networks 100 or can use the Public Switched Telephone Network and trunk interface 116B. Alternatively, the program source can be a local program source 120 for local news and information, that is connected via a data communication medium, such as the Internet 107, to an Internet server interface 115 of the communique system for cellular communication networks 100. In addition, a program source, such as local program source 121 is connected via the Public Switched Telephone Network 108 to a trunk interface 116A of the communique system for cellular communication networks 100. In addition, a local terminal device 127 can be connected via interface 110 to the communique system for cellular communication networks 100 for inputting information. The various program sources provide information of various types, including but not limited to: news, advertisements, traffic, weather, travel information, and the like.

The communique system for cellular communication networks 100 also includes a local mass storage memory 119 for storing control instructions for use by processor 118 as well as program material received from the various program sources identified above. A processor complex that includes Spatial-Temporal Content Manager 114 to manage the definition of the cells to which a particular Communiqué is transmitted controls the communiqué system for cellular communication networks 100. Furthermore, communique system for cellular communication networks 100 includes Program Manager 113 to integrate information received from the various program sources into Communiques that are transmitted over selected Traffic channels of the forward CDMA channel within one or more cells as identified by the Spatial-Temporal Content Manager 114. The Communiques generated by the Program Manager 113 are transmitted to the various Base Station Subsystems 131-151 identified by the Spatial-Temporal Content Manager 114 either directly or via the associated Mobile Telephone Switching Office 106. The Program Manager 113 functions to assemble program streams as described below and transmits the program streams containing the Communiques via a selected communication medium, such as the Public Switched Telephone Network 108, using network interface 116A, or some other communication medium, such as an IP network.

Content Domain Narrowcast

An alternative to the use of centralized, predetermined Communiques that are formatted at the communique system for cellular communication networks 100 and transmitted via the Base Station Subsystems 132, 142, 152 to the wireless subscriber devices, the delivery of information can be effected by using the content domain as a distribution format. The content domain enables the communique system for cellular communication networks 100 to achieve a dynamic, changeable broadcast/narrowcast without modifying or reconfiguring the RF network domain.

Figure 8:
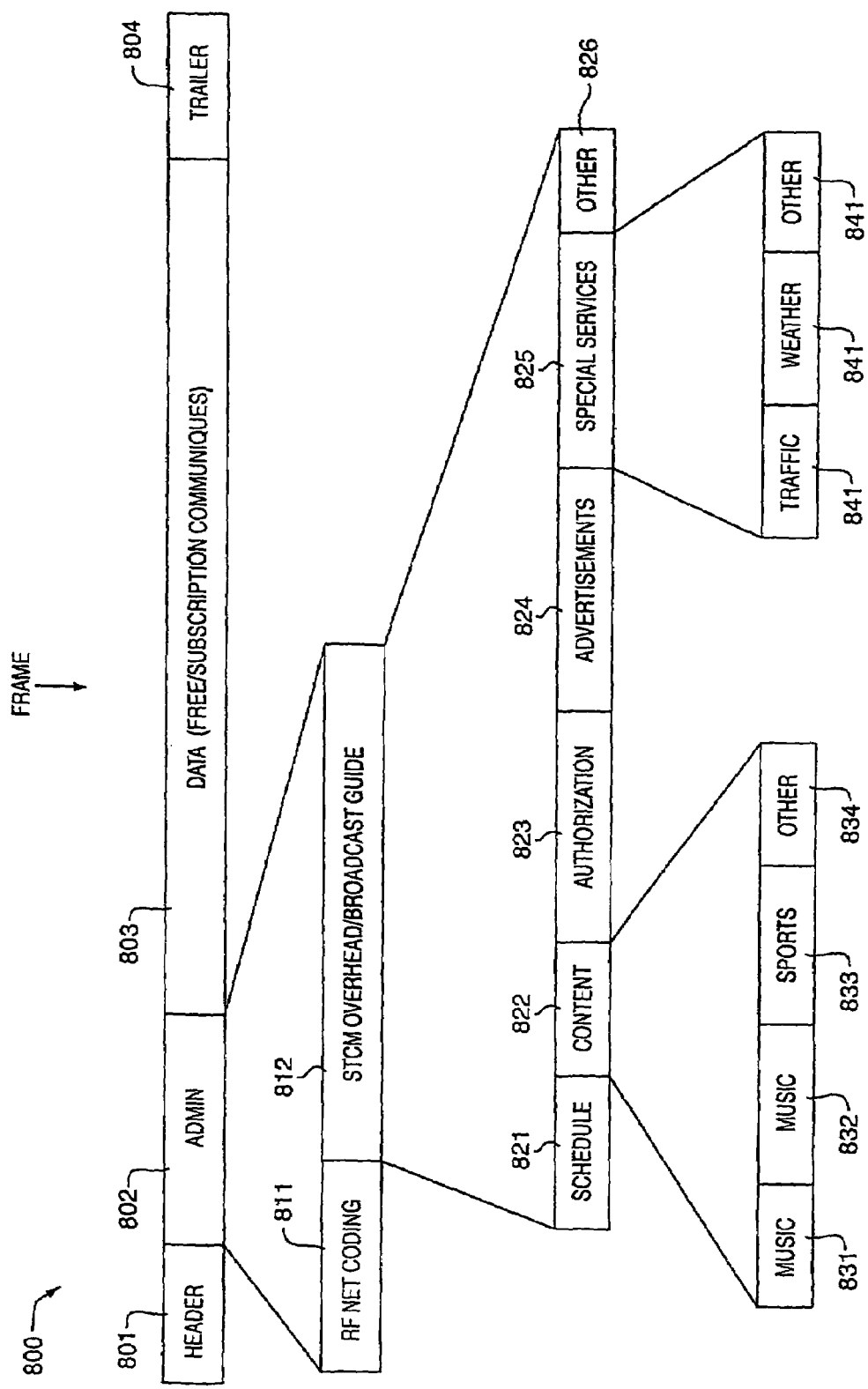
FIG. 8 illustrates in block diagram form a typical signaling protocol for a Traffic channel for use in the present communique system for cellular communication networks.
Figure 12:
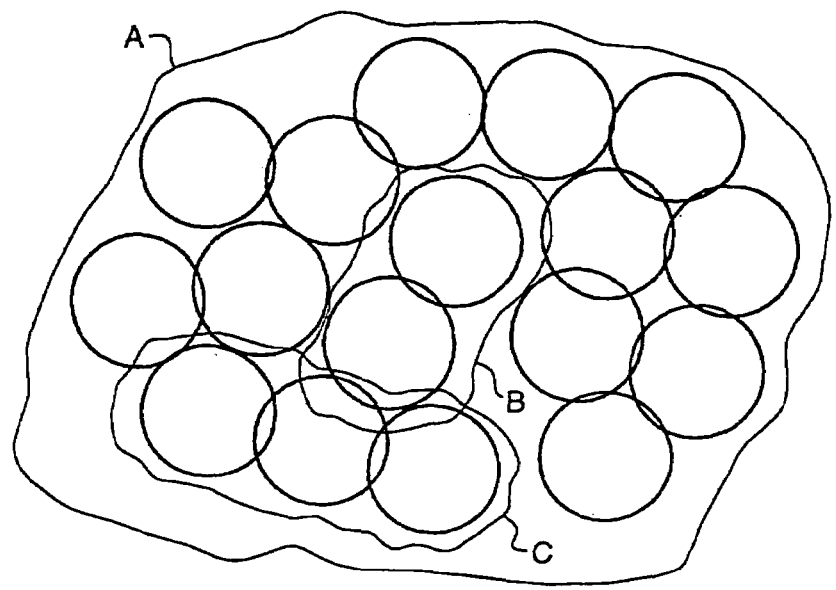
FIG. 12 illustrates a typical program coverage pattern.

In particular, a broadband program stream containing all information for all cells can be created by the Spatial-Temporal Content Manager 114. This information, such as that described below with respect to FIG. 8, is delivered to the Mobile Telephone Switching Office 106 for distribution to all relevant Base Station Subsystems 132, 142, 152. The Base Station Subsystems 132, 142, 152 can either parse the information contained in the frame into a plurality of Communiques for transmission in their cells, such as the plurality of cells included in coverage areas A-C shown on FIG. 12. Alternatively, the information can be passed directly to the wireless subscriber devices for parsing therein. However, it is expected that the bandwidth limitations in the communication link from the Base Station Subsystems 132, 142, 152 to the wireless subscriber devices render the former parsing scheme preferable to parsing at the wireless subscriber device. Yet another alternative is the hierarchical parsing of the information, where the Base Station Subsystems 132, 142, 152 parse the received information frame into a plurality of subframes of similar format and reduced content for transmission to the wireless subscriber devices for further parsing of the subframes into the individual Communiques. This process utilizes the available bandwidth to provide the wireless subscriber devices with the information necessary to produce a number of Communiques, thereby eliminating the need for the Base Station Subsystems 132, 142, 152 to communicate with the wireless subscriber devices to switch channels to access other Communiques. This distributed switching and hierarchical information delivery architecture thereby reduces the Paging channel traffic for the Base Station Subsystems 132, 142, 152.

Figure 11:
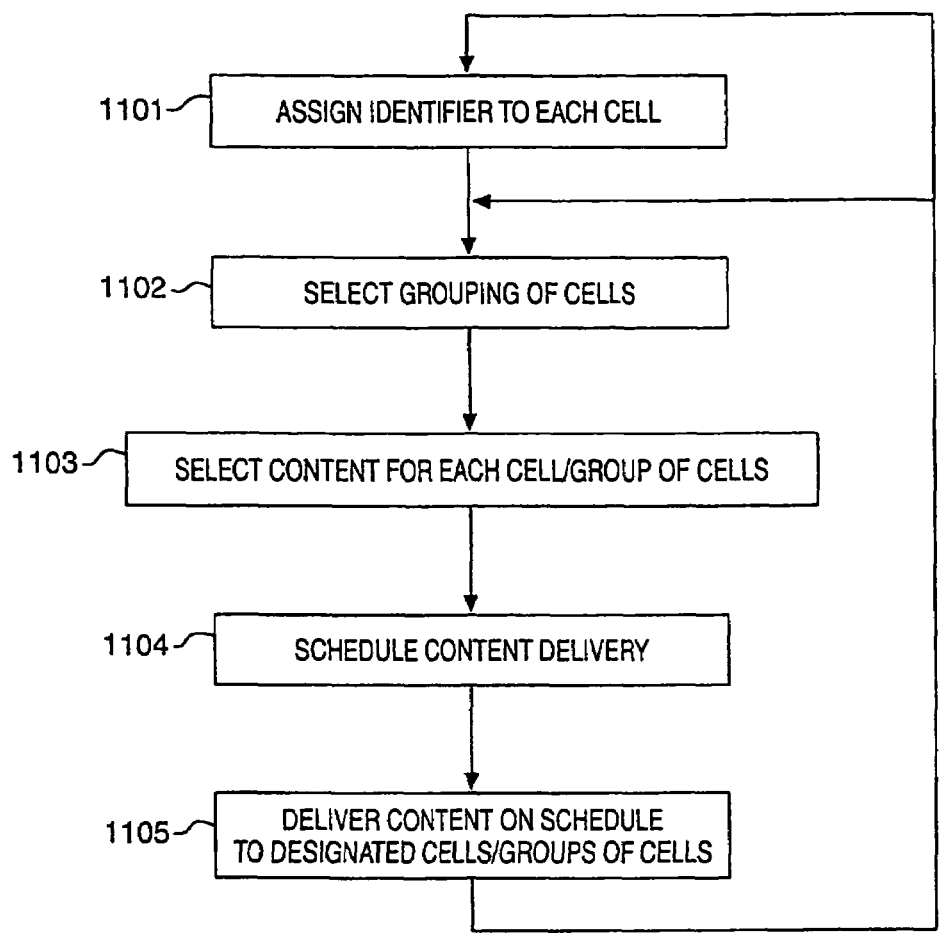
FIG. 11 illustrates in flow diagram form the operation of the Spatial-Temporal Content Manager.

The Spatial-Temporal Content Manager 114 controls the actual information that is transmitted from each cell site by sending program stream parsing control signals to routers contained in the Base Station Controllers 132, 142, 152 at each cell site which then, on a distributed basis, re-assemble the broadband program stream containing all information for all cells into a data stream that is only relevant for that particular cell. By grouping cells as shown on FIG. 12 into "content similar blocks" or more specifically coverage areas A-C, the Spatial-Temporal Content Manager 114 has commanded the routers at the cell sites to parse the broadband program stream identically for the grouped cells (as predefined by the systems programming or a content programming operator), the effect of a narrowcast can be achieved without modifying the RF network architecture. From the subscriber's perspective, he is only receiving narrowcast information when in the grouped cells' transmission range. As the subscriber moves from one region to another, the broadcast/narrowcast Communique received may be different depending on the spatial programming of the Spatial-Temporal Content Manager 114. Also, over time, a given narrowcast region may change in its physical shape or disappear altogether. The operation of this Spatial-Temporal Content Manager 114 is illustrated in flow diagram form in FIG. 11 where at step 1101 each cell in the cellular communication network the is served by the communique system for cellular 20 communication networks 100 is assigned a unique address, using a selected protocol, such as TCP/IP. At step 1102, the cells are grouped into collections comprising coverage areas. The program content in the form of Communiques are selected at step 1103 and assigned to destinations, using the cell addresses assigned at step 1101. At step 1104, the Communique schedule is defined in terms of time of transmission, duration of transmission, duration of narrowcast region, temporal and/or spatial characteristics of narrowcast region, and the like. Finally, at step 1105, the identified Communiques are transmitted to the selected cells using the assigned cell addresses. The transmission can occur on a real time basis where the Communiques are provided to the cells at the time they are to be broadcast, or the Communiques can be distributed in advance of transmission and stored for future transmission. The process of FIG. 11 then returns to either step 1101 where address information is updated as needed or step 1102 where the cell groupings are modified and the process cycles through the above-noted steps as required.

One disadvantage of this particular distributed re-assembly approach is with a CDMA architecture designed to operate in soft or softer handoff (this limitation is not present in an analog or TDMA architecture since they do not operate in soft handoff). Since the data streams must be identical for the wireless subscriber device to operate in soft handoff, as a subscriber transitions form the boundary of one narrowcast region to another, the number of cell sites available to be in soft handoff is varying and could be zero. One method for solving this limited shortcoming is to broadcast the broadband content stream from all sites all the time and put the router function within the wireless subscriber device itself. Commands on how to re-assemble the content is based on a subscriber's physical location and the signaling is done on an in-band basis (i.e. the data parsing commands are contained within the traffic channel in a TDM fashion). This reduces the effective available bandwidth for a narrowcast since much of the broadband content is not for a given subscriber and is ☐thrown☐ away by a given subscriber. It also places higher computing power at the wireless subscriber device in order to parse the data. Again, if soft handoff is not required for reliable CDMA operation, the aforementioned limitation is not a concern and parsing can be done at the cell site. And, in either parsing scheme, distributed at the cell site or distributed at the wireless subscriber device, if the content is overlaid on an analog or TDMA network, the soft handoff limitation is not an issue.

Management of Spatial-Temporal Control of Distributed Content

Conceptually, the programming of the broadcast/narrowcast regions for management by the Program Manager 113 is done initially by content operators (people) who pre-program the system for content distribution. As a general principle, the content can be classified into groups such as:

| | |
|---|---|
| Diurnal Narrowcasts | (e.g. AM/PM traffic reports along highways) |
| Special Narrowcasts | (e.g. football game, art-in-the-park) |
| Campuses | (e.g. schools, work complexes) |
| General | (e.g. news weather sports) |
| Other | |

Much of the programming is repetitive and only needs to be done once i.e. a diurnal narrowcast. One-time only events can be programmed in advance, and say for a football game, can retain all of the programming features such as it☐s spatial coverage extent, and only need to be recalled and given a new narrowcast execution time window. From a user interface perspective, imagine a GUI that displays all of the cells available for a broadcast/narrowcast wherein an operator can select given cells to form a narrowcast region. This region is then saved as a narrowcast group. Next, the operator goes to another GUI screen that contains all available broadcast information and selects which content files are appropriate for the narrowcast group just previously designed. Last, the operator defines the time window for the narrowcast. By repeating this process and building a database of spatial, temporal and content information, all requisite knowledge is programmed into the system for a 24 hour 7 day operation in the Spatial-Temporal Content Manager.

Figure 5:
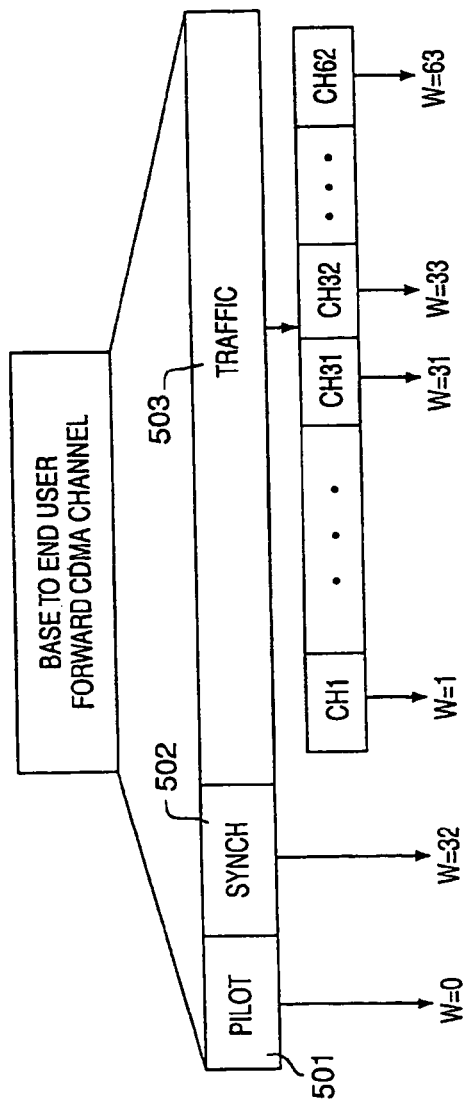
FIG. 5 illustrates in block diagram form a typical configuration of the base to end user forward CDMA channel used in cellular communication networks.

The database, at a minimum, has the following fields:
Start Time
Stop Time
Narrowcast Cell Grouping
Broadcast Cell Grouping
Narrowcast Content Stream
Broadcast Content Stream
Other Format of the Forward CDMA Channel for Communique Architectures FIG. 5 illustrates in block diagram form a typical configuration of the Base Station Subsystem 131 to communiqué wireless subscriber device MS forward CDMA channel used for Communique transmissions in cellular communication networks. As noted above, the typical Base Station Subsystem 131 to communique wireless subscriber device MS forward CDMA channel comprises a predefined bandwidth centered about a selected carrier frequency. The bandwidth of the selected channel as well as the selected carrier frequency is a function of the technical implementation of the base station of the cellular network and is not discussed further herein. The communication space for Communique transmissions is typically divided into a plurality of segments: Pilot 501, Synchronization (Synch) 502, Traffic 503. The Traffic 503 segment is further divided into a plurality of channels Ch1-Ch62. Each traffic channel represents a communication space for a selected communiqué wireless subscriber device MS. The plurality of traffic channels CH1-CH62 as shown in FIG. 5 are assigned the remaining Walsh codes. Each Traffic channel consists of data traffic as well as in band signaling transmitted from the Base Station Subsystem 131 to the communiqué wireless subscriber device MS, as noted above.

Typical Content Transmission Format

FIG. 8 illustrates in block diagram form a typical signaling protocol for use in the present communique system for cellular communication networks 100. A frame 800 can be used to transmit both content as well as control information and a broadcast guide. The frame 800 is shown in one typical form, although the particulars of the frame 800 can vary as a function of the use of this element. In particular as noted above, a broadband program stream containing all information for all cells can be created by the Spatial-Temporal Content Manager 114. This information is delivered to the Mobile Telephone Switching Office 106 via a communication medium, such as the Public Switched Telephone Network 108, for distribution to all relevant Base Station Subsystems 132, 142, 152. The Base Station Subsystems 132, 142, 152 can either parse the information contained in the frame into a plurality of Communiques for transmission in their cells, such as the plurality of cells included in coverage areas A-C shown on FIG. 12. Alternatively, the information can be passed directly to the wireless subscriber devices for parsing therein. Yet another alternative is the hierarchical parsing of the information, where the Base Station Subsystems 132, 142, 152 parse the received information frame into a plurality of subframes of similar format and reduced content for transmission to the wireless subscriber devices for further parsing of the subframes into the individual Communiques.

The frame 800 has a plurality of constituent parts, including a Header 801, Administration 802, Data 803 and Trailer 804. The Header 801 and Trailer 804 are used to identify the beginning and end of the Frame 800 and can include error check bits to ensure proper transmission of the data. The Administration 802 is used to convey various control information to the Base Station Subsystem and to the wireless subscriber device. The Administration 802 can include a Radio Frequency Configuration segment 811 that defines the Traffic channel on which the frame is to be broadcast. The remaining segments of the Administration 802 consist of a "Program Guide" 812 which includes a schedule segment 821 to define the time at which the frame is to be transmitted and the information parsing data, content definition segment 822 the defines the content of the data section 803 of the frame 800 (and optionally the information parsing data), Authorization segment 823 which defines the type of service associated with the content of the data section 803 of the frame 800. Advertisements 824 can also be included in the Program Guide 812, along with optional special services 825, such as traffic reports 841, public service announcements 842 and the like 843. Other segments 826 can optionally be included. In the content segment 822, the content definitions describe the information that is available, and a plurality of such elements is shown to illustrate this concept, including but not limited to: music 831, 832, sports 833 and other programs 834.

It is evident that this example of a format is simply an illustration and it is expected that numerous variations can be implemented that fall within the scope of the concept taught herein. In particular, in the case of hierarchical parsing, the frame that is transmitted to the wireless subscriber device would be a reduced content version of frame 800, since the content would be reduced to match the bandwidth capabilities of the communication link from the Base Station Subsystems 132, 142, 152 to the wireless subscriber devices.

Program Stream Management

Figure 13:
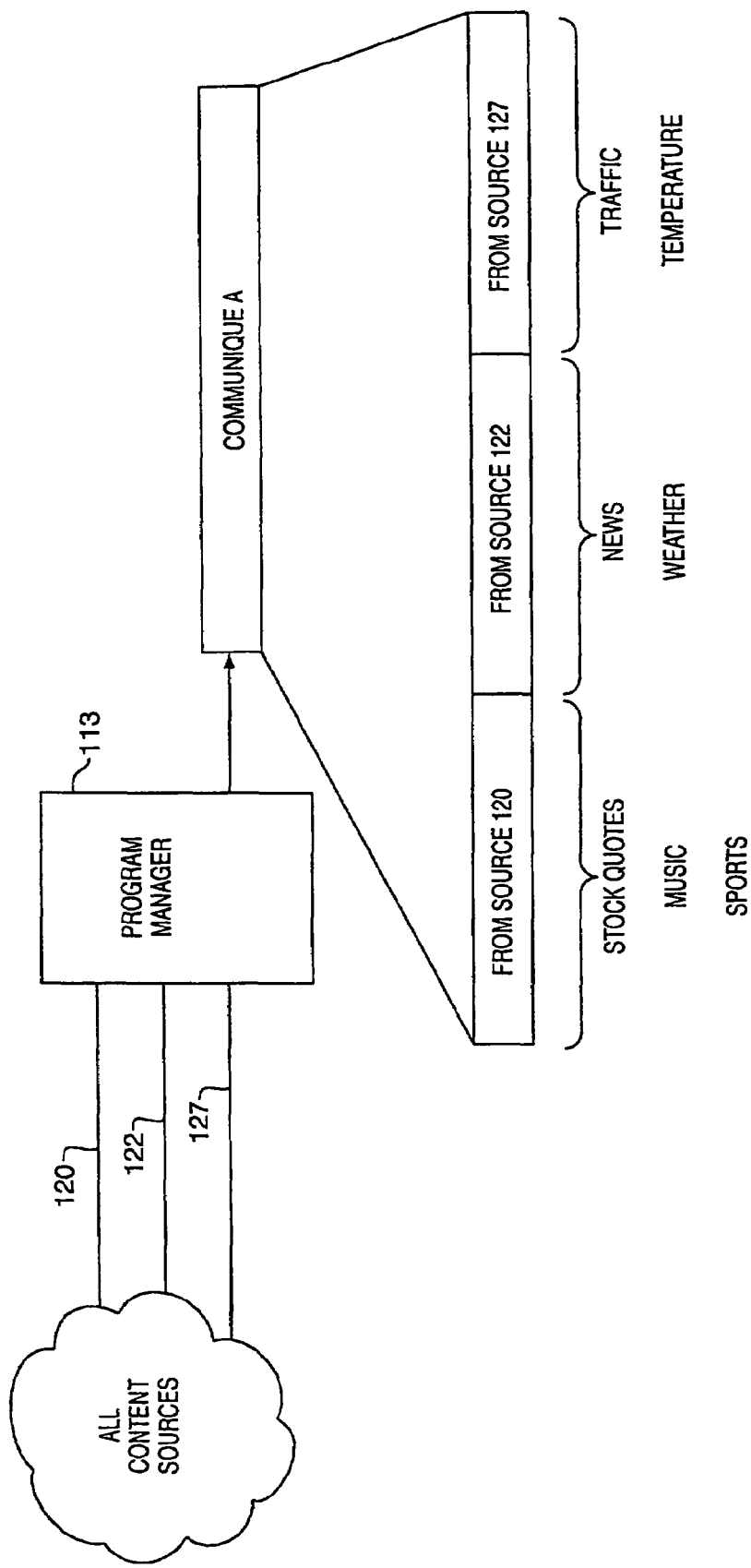
FIG. 13 illustrates a typical program stream for a plurality of communication channels.

FIG. 13 illustrates a typical stream for a plurality of communication channels. Communiqués are formed by the Program Manager, 113, and the Spatial Temporal Communique Manager 114, and delivered to the cellular system via the Public Switched Telephone Network 108, which is comprised of a grouping of various architectures (circuit, packet switched (e.g. TCP/IP), ATM, frame relay, satellite and so on) to convey the information from the Communique System 100, to the Mobile Telephone Switching Office 106, to Base Station Subsystem 131,141,151 and ultimately to Base Station Transceiver 133,143,144,153 for transmission as a broadcast/narrowcast Communique to the various wireless subscriber devices. The Communiques can be labeled in any manner appropriate for composite system operation, and for this example, the Communiques are given alpha designators (A, B, C and so on). A given Communique may have spatial relevance and could be targeted by the Spatial Temporal Communique Manager 114, for delivery to a specific region.

As shown in FIG. 13, the example Communique A comprises programming from sources:

National Source 122, content residing at key media nodes (in a centralized manner); Regional Source 120, content residing at a plurality of media nodes attached to the Internet (in a centralized/decentralized manner);

Local Source 121, content residing at a plurality of media nodes connected via the Local Exchange Carrier (in a decentralized manner);

Local Source 127, content residing at end-user nodes (in a decentralized manner).

The content from Regional Source 120 is diverse in its substance and embodies the plethora of media available on the Internet (data, stock quotes, music, video, email, special interest, sports, news and so on). The content from National Source 122 comprises more general information that is applicable to many Communiques such as news, weather and sports. The content from Local Source 127 is information gathered and conveyed by the end-user in an active or passive mode. An example of Active information is identifying that a particular lane on a particular highway is blocked. Passive information may be reporting of outside air temperature.

To generate Communique A as shown in FIG. 13, the Program Manager 113, collects and collates all available content from sources 120, 122 and 127 from the universe of All Content Sources and forms/creates/parses 120, 122 and 127 to the desired, predetermined information stream thereby creating Communique A. In this example, it is desired to deliver Communique A to narrowcast region 910. This is the responsibility of the Spatial Temporal Communique Manager 114.

Communique A contains the following content in this example:

From Regional Source 120:
  stock quotes (free to the end-user)
  music (channelized) (free/subscription to the end-user)
  composite traffic flow map (subscription to the end-user)
  other From National Source 122:
  news (free to the end user)
  weather (free to the end user) sports (free to the end user)
  other
From Local Source 127:
  end-user traffic data (free to the network)
  end-user temperature data (free to the network) other Each individual content stream can also contain advertising (typical for a free service). Typical subscription services would not contain advertising.

The Spatial Temporal Content Manager (STCM) 114, receives all Communiques from the Program Manager 113, and assigns the communiques for a given period of time to given cells to form narrowcast regions in the time domain. Communique A, which is the data payload for 803 delivered to a narrowcast region, is but one of many Communique☐Narrowcast☐Time pairings that occurs in the Spatial Temporal Communique Manager 114. In addition to Communique A:

Communique B is a diurnal narrowcast.
Communiqué C is a special event narrowcast.
In this example, Communiques A & B are repeated daily.

The Spatial Temporal Communique Manager 114, through repetitive programming, ensures that all cells, whether standalone or grouped into a narrowcast region, have content available 24 hours per day 7 days per week.

The programming described herein is deterministic meaning the content contained within a Communique, where a Communique is transmitted and how long a communiqué is transmitted is pre-programmed by the network operator. Another embodiment concerns dynamic active feedback from end-users within a given narrowcast region to ☐inform☐ the Spatial Temporal Communique Manager 114, whether or not they are within the narrowcast region. The Spatial Temporal Communique Manager 114, can be embodied with a form of artificial intelligence to not only change the narrowcast region at a time different than scheduled but also change the content, or Communique within the new region.

Communiqué Content Selection Via Subscriber Profiles

Figure 10:
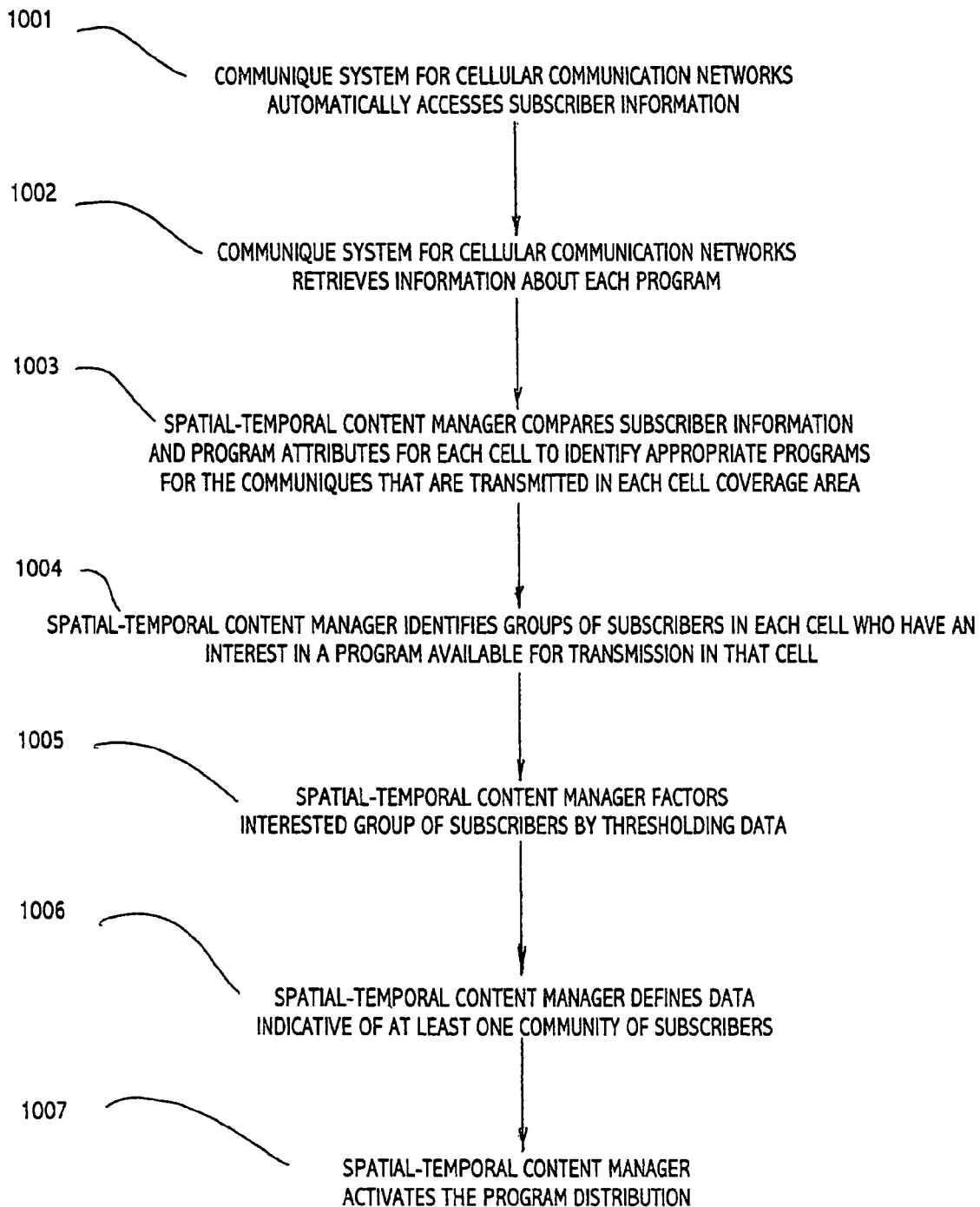
FIG. 10 illustrates in flow diagram form one mode of using subscriber information as active feedback in the operation of the present communique system for cellular communication networks.

FIG. 10 illustrates in flow diagram form one mode of using subscriber information as active feedback in the operation of the present communiqué system for cellular communication networks. The communiqué system for cellular communication networks 100 can dynamically and automatically manage both the content of the narrowcasts and the scope of coverage of the narrowcasts by use of subscriber information.

This is accomplished where the communiqué system for cellular communication networks 100 at step 1001 automatically accesses the subscriber's authorization and service plans, as well as (optionally) the subscriber profiles for the subscribers, which for simplicity are termed "subscriber information" herein, for each subscriber in a given cell, which subscriber profile describes the subscriber's interest level, and/or subscription to various types of programs. This subscriber information, as noted above, can be stored, for example, as part of the subscriber-specific record in the Communiqué Location Register 163 or stored within the communiqué wireless subscriber device MS in profile memory PS.

The Spatial-Temporal Content Manager 114 of the communiqué system for cellular communication networks 100 retrieves from its memory and/or retrieves from another source, such as the program source, one or more pieces of information about each program at step 1002. These pieces of information are termed "attributes" which can be data in any form and format, which can also be decomposed into a numeric measure, which numeric measure is associated with a content parameter. This means that any set of attributes can be replaced by a set of numeric measures, and hence any profile can be represented as a vector of numbers denoting the values of these numeric measures for each content parameter. In this manner, the program is numerically quantified based upon a number of predetermined parameters or program characteristics. Relevance feedback can also be used herein as part of the subscriber information, since it determines the subscriber's interest in certain programs: namely, the programs that the subscriber has actually had the opportunity to evaluate (whether actively or passively). For programs of a type that the subscriber has not yet seen, a content filtering system must estimate the likelihood of a subscriber's interest in the program. This estimation task is the heart of the filtering problem, and the reason that the similarity measurement is important.

The Spatial-Temporal Content Manager 114 on a dynamic basis can automatically compute the evaluation of the likelihood of interest in a particular program for a specific subscriber. The communiqué system for cellular communication networks 100 uses the Spatial-Temporal Content Manager 114 to evaluate a given set of available programs against the subscriber information for the subscribers who are active within each cell site coverage area to identify whether any of the presently available programs are of interest to these subscribers so that the subscribers can be advised of relevant programs, which are automatically selected by the communiqué system for cellular communication networks for transmission to selected cells. Each subscriber is advised of the availability of the program transmitted in their cell that closely matches the subscriber's interests as described by the subscriber's information in the Communiqué Location Register 163. Subscriber's information is automatically updated on a continuing basis to reflect each subscriber's changing interests.

The use of this information to dynamically alter the content of Communiqués and the communiqué coverage area can be effected in several modes. The typical mode is where programs are available from the program sources and the communiqué system for cellular communication networks 100 must determine the appropriate community of subscribers, if any, for each or at least a plurality of these programs. This is a "push" mode of program delivery, where the programs are migrated to the determined communities of subscribers. An alternative mode of delivery of programs is the "pull" mode, where the subscribers request access to programs and the communiqué system for cellular communication networks 100 creates communiqué coverage areas to deliver the requested programs to the subscribers. The former case is used as an example herein, since it is the typical mode of program delivery.

The subscriber information and program attributes are compared by the Spatial-Temporal Content Manager 114 at step 1003 for each cell in order to identify appropriate programs for the Communiqués that are transmitted in each cell coverage area. Thus, subscriber clustering can be used on the basis of subscribers active in each cell, which clustering data is correlated with the program available for narrowcast in the cell. This results at step 1004 in the identification of groups of subscribers in each cell who have an interest in a program available for transmission in that cell. This interested group of subscribers can also be factored at step 1005 by thresholding data, such as: number of said identified subscribers entering into and moving out of a cell of the cellular communication network, number of subscribers active in a cell of the cellular communication network, services requested by identified subscribers active in a cell of the cellular communication network, density of subscribers active in the cellular communication network. These factors can be used to modify the program selection based on subscriber population and activity so that bandwidth is not expended to serve a minimal number of subscribers in any particular cell. The result of these computations is that the Spatial-Temporal Content Manager 114 at step 1006 defines data indicative of at least one community of subscribers, with each of the communities of subscribers comprising a plurality of subscribers who are active in at least one cell of the cellular communication network and who have an interest in an identified program. This community data therefore is used at step 1007 to activate the program distribution as described herein to create a narrowcast coverage area which transmits a selected program via at least one cell to an identified population of subscribers who are active in the identified cells.

SUMMARY

The communiqué system for cellular communication networks groups cells and/or cell sectors to cover a predetermined geographic area or demographic population or subscriber interest group to transmit information to subscribers who populate the target audience for the narrowcast transmissions. The grouping of cells to form the communique coverage area for the narrowcast transmissions can be hierarchical in nature and consist of combinations of in-building wireless coverage areas, standard terrestrial cells, non-terrestrial cells, orchestrated in a hierarchical manner.

What is claimed is:

1. A communiqué wireless subscriber device for providing communiqué services to subscribers, via a cellular communication network that includes a plurality of cell sites, each of which provides a plurality of wireless communication channels in a cell, said cellular communication network transmitting communiqués on at least one of said plurality of wireless communication channels, said communiqué wireless subscriber device comprising:

means for communicating on a wireless basis with at least one of said plurality of cell sites;

means for storing a communiqué identifier that is common to a plurality of wireless subscriber devices in said communiqué wireless subscriber device; and means, responsive to said communiqué identifier, for selecting at least one of said plurality of wireless communication channels to receive, concurrently with more than one of a plurality of wireless subscriber devices, said communiqués that are transmitted by said cell sites on the at least said selected one of said selected plurality of wireless communication channels.

2. The communiqué wireless subscriber device of claim 1 wherein said means for selecting comprises:

means for identifying at least one of said plurality of wireless communication channels based on said communiqué identifier; and means for activating said means for communicating to receive said communiqué's on at least one of said identified plurality of wireless communication channels.

3. The communiqué wireless subscriber device of claim 1 wherein said means for selecting comprises:

means for transmitting said communiqué identifier to at least one of said plurality of cell sites to enable receipt of said communiqués wirelessly conveyed to said communiqué wireless subscriber device by at least one of said plurality of cell sites.

4. The communiqué wireless subscriber device of claim 3 wherein said means for selecting further comprises:
  means for receiving data from said cellular communication network that identifies said at least one of plurality of wireless communication channels; and
  means for activating said means for communicating to receive said communiqués on at least one of said identified plurality of wireless communication channels.

5. The communiqué wireless subscriber device of claim 4 further comprising:
  means for storing a communiqué device identifier that uniquely identifies said communiqué wireless subscriber device.

6. The communiqué wireless subscriber device of claim 5 further comprising:
  means for transmitting said communiqué device identifier to at least one of said plurality of cell sites to request access to subscription-based communiqués.

7. The communiqué wireless subscriber device of claim 6 further comprising:
  means for activating said means for communicating to transmit data to said cell sites for transmission to other subscribers.

8. The communiqué wireless subscriber device of claim 4 further comprising:
  means for storing subscriber profile data in a memory; and
  means for filtering said received communiqués using said subscriber profile data.

9. The communiqué wireless subscriber device of claim 8 wherein said means for filtering comprises:
  means for parsing program content of said received communiqués pursuant to a predefined content definition contained in said communiqué identifier.

10. The communiqué wireless subscriber device of claim 8 wherein said means for filtering comprises:
  means for storing subscriber profile data indicative of program content interests for a subscriber; and
  means for parsing program content of said received communiqués pursuant to a predefined content definition contained in said subscriber profile data.

11. The communiqué wireless subscriber device of claim 1 further comprising:
  means for measuring an immutable physical characteristic of a subscriber.

12. The communiqué wireless subscriber device of claim 11 further comprising:
  means for transmitting data to at least one of said plurality of cell sites indicative of said measured immutable physical characteristic of the subscriber.

13. A method of operating a communiqué wireless subscriber device for providing communiqué services to subscribers, via a cellular communication network that includes a plurality of cell sites, each of which provides a plurality of wireless communication channels in a cell, said cellular communication network transmitting communiqués on at least one of said plurality of wireless communication channels, said communiqué wireless subscriber device comprising the steps of:
  communicating on a wireless basis with at least one of said plurality of cell sites;
  storing a communiqué identifier that is common to a plurality of wireless subscriber devices in said communiqué wireless subscriber device; and
  selecting, in responsive to said communiqué identifier, at least one of said plurality of wireless communication channels to receive, concurrently with more than one of a plurality of wireless subscriber devices, said communiqués that are transmitted by said cell sites on the at least said selected one of said identified plurality of wireless communication channels.

14. The method of operating the communiqué wireless subscriber device of claim 13 wherein said step of selecting comprises:
  identifying at least one of said plurality of wireless communication channels based on said communiqué identifier; and
  activating said means for communicating to receive said communiqués on at least one of said identified plurality of wireless communication channels.

15. The method of operating the communiqué wireless subscriber device of claim 13 wherein said step of selecting comprises:
  transmitting said communiqué identifier to at least one of said plurality of cell sites to enable receipt of said communiqués wirelessly conveyed to said communiqué wireless subscriber device by at least one of said plurality of cell sites.

16. The method of operating the communiqué wireless subscriber device of claim 15 wherein said step of selecting further comprises:
  receiving data from said cellular communication network that identifies at least one of said plurality of wireless communication channels; and
  activating said means for communicating to receive said communiqués on at least one of said identified plurality of wireless communication channels.

17. The method of operating the communiqué wireless subscriber device of claim 16 further comprising the step of:
  storing a communiqué device identifier that uniquely identifies said communiqué wireless subscriber device.

18. The method of operating the communiqué wireless subscriber device of claim 17 further comprising the step of:
  transmitting communiqué device identifier to said at least one of said plurality of cell sites to request access to subscription-based communiqués.

19. The method of operating the communiqué wireless subscriber device of claim 18 further comprising the step of:
  activating said step of communicating to transmit data to said cell sites for transmission to other subscribers.

20. The method of operating the communiqué wireless subscriber device of claim 16 further comprising the steps of:
  storing subscriber profile data in a memory; and
  filtering said received communiqués using said subscriber profile data.

21. The method of operating the communiqué wireless subscriber device of claim 20 wherein said step of filtering comprises:
  parsing program content of said received communiqués pursuant to a predefined content definition contained in said communiqué identifier.

22. The method of operating the communiqué wireless subscriber device of claim 20 wherein said step of filtering comprises:
  storing subscriber profile data indicative of program content interests for a subscriber; and
  parsing program content of said received communiqués pursuant to a predefined content definition contained in said subscriber profile data.

23. The method of operating the communiqué wireless subscriber device of claim 13 further comprising the step of:
  measuring an immutable physical characteristic of a subscriber.

24. The method of operating the communiqué wireless subscriber device of claim 23 further comprising the step of:
transmitting data to at least one of said plurality of cell sites indicative of said measured immutable physical characteristic of the subscriber.

25. A communiqué wireless subscriber device for providing communiqué services to subscribers, via a cellular communication network that includes a plurality of cell sites, each of which provides a plurality of wireless communication channels in a cell, said cellular communication network transmitting communiqués on at least one of said plurality of wireless communication channels, said communiqué wireless subscriber device comprising:
transceiver means for communicating on a wireless basis with at least one of said plurality of cell sites;
profile memory means for storing a communiqué identifier that is common to a plurality of wireless subscriber devices in said communiqué wireless subscriber device; and
control means, responsive to said communiqué identifier, for selecting at least one of said plurality of wireless communication channels to receive, concurrently with more than one of a plurality of wireless subscriber devices, said communiqués that are transmitted by said cell sites on the at least said selected one of said selected plurality of wireless communication channels.

26. The communiqué wireless subscriber device of claim 25 wherein said control means comprises:
means for identifying at least one of said plurality of wireless communication channels based on said communiqué identifier; and
means for activating said means for communicating to receive said communiqués on at least one of said identified plurality of wireless communication channels.

27. The communiqué wireless subscriber device of claim 25 wherein said control means comprises:
spoofing means for transmitting said communiqué identifier to at least one of said plurality of cell sites to enable receipt of said communiqués wirelessly conveyed to said communiqué wireless subscriber device by said at least one of plurality of cell sites.

28. The communiqué wireless subscriber device of claim 27 wherein said control means further comprises:
administrative control means for receiving data from said cellular communication network that identifies at least one of said plurality of wireless communication channels; and
channel select means for activating said transceiver means to receive said communiqués at least one of said identified plurality of wireless communication channels.

29. The communiqué wireless subscriber device of claim 28 further comprising:
profile memory means for storing a communiqué device identifier that uniquely identifies said communiqué wireless subscriber device.

30. The communiqué wireless subscriber device of claim 29 further comprising:
MIN means for transmitting said communiqué device identifier to at least one of said plurality of cell sites to request access to subscription-based communiqués.

31. The communiqué wireless subscriber device of claim 30 further comprising:
channel select means for activating said transceiver means to transmit data to said cell sites for transmission to other subscribers.

32. The communiqué wireless subscriber device of claim 28 further comprising:
profile memory means for storing subscriber profile data in a memory; and
content parsing means for filtering said received communiqués using said subscriber profile data.

33. The communiqué wireless subscriber device of claim 32 wherein said content parsing means comprises:
means for parsing program content of said received communiqués pursuant to a predefined content definition contained in said communiqué identifier.

34. The communiqué wireless subscriber device of claim 32 wherein said content parsing means comprises:
profile memory means for storing subscriber profile data indicative of program content interests for a subscriber; and
means for parsing program content of said received communiqués pursuant to a predefined content definition contained in said subscriber profile data.

35. The communiqué wireless subscriber device of claim 25 further comprising:
biometric means for measuring an immutable physical characteristic of a subscriber.

36. The communiqué wireless subscriber device of claim 35 further comprising:
voice data switch means for transmitting data to at least one of said plurality of cell sites indicative of said measured immutable physical characteristic of the subscriber.

* * * * *